United States Patent
Miu et al.

(10) Patent No.: US 12,235,389 B2
(45) Date of Patent: Feb. 25, 2025

(54) AUTOMOTIVE RADAR / LIDAR BEHIND REFLECTIVE SURFACES

(71) Applicant: Magna Electronics Inc., Auburn Hills, MI (US)

(72) Inventors: Traian Miu, Oakville (CA); Gabriele Wayne Sabatini, Oakville (CA)

(73) Assignee: Magna Electronics Inc., Auburn Hills, MI (US)

( * ) Notice: Subject to any disclaimer, the term of this patent is extended or adjusted under 35 U.S.C. 154(b) by 1297 days.

(21) Appl. No.: 16/554,701

(22) Filed: Aug. 29, 2019

(65) Prior Publication Data
US 2020/0072947 A1 Mar. 5, 2020

Related U.S. Application Data

(60) Provisional application No. 62/725,480, filed on Aug. 31, 2018.

(51) Int. Cl.
*G01S 7/481* (2006.01)
*B60R 1/12* (2006.01)
(Continued)

(52) U.S. Cl.
CPC .............. *G01S 7/4813* (2013.01); *B60R 1/12* (2013.01); *B60R 13/005* (2013.01); *B60R 13/04* (2013.01);
(Continued)

(58) Field of Classification Search
CPC .... G01S 7/4813; G01S 17/931; G01S 13/931; G01S 2013/9327; G01S 7/027;
(Continued)

(56) References Cited

U.S. PATENT DOCUMENTS 6,496,138 B1 * 12/2002 Honma .................. H01Q 19/08
343/873
8,702,135 B2 4/2014 Gaboury et al.
(Continued)

FOREIGN PATENT DOCUMENTS

CN 101532851 A 9/2009
CN 102549482 A 7/2012
(Continued)

OTHER PUBLICATIONS

Z.C. Ye et al. "Compact Transreflective Color Filters and Polarizers by Bilayer Metallic Nanowire Gratings on Flexible Substrates," in IEEE Journal of Selected Topics in Quantum Electronics, vol. 19, No. 3, Art No. 4800205, May-Jun. 2013, doi: 10.1109/JSTQE.2012. 2227247. (Year: 2013).*

(Continued)

*Primary Examiner* — Olumide Ajibade Akonai
*Assistant Examiner* — Yonghong Li
(74) *Attorney, Agent, or Firm* — HONIGMAN LLP

(57) ABSTRACT

A sensor assembly for detecting an object and a method of forming a sensor port in sheet metal are disclosed. The sensor assembly includes at least one electromagnetic source for emitting electromagnetic waves. The sensor assembly also includes at least one electromagnetic receiver for receiving the electromagnetic waves after reflecting from the object and corresponding with a detection of the object in proximity to the sensor assembly. In addition, the sensor assembly includes a filter cover disposed adjacent to and covering the at least one electromagnetic source and the at least one electromagnetic receiver configured to allow the electromagnetic waves to pass therethrough while reflecting visible light, thereby concealing the at least one electromagnetic source and the at least one electromagnetic receiver.

18 Claims, 30 Drawing Sheets

(51) Int. Cl.
| | |
|---|---|
| *B60R 13/00* | (2006.01) |
| *B60R 13/04* | (2006.01) |
| *G01S 13/931* | (2020.01) |
| *G01S 17/931* | (2020.01) |
| *G02B 5/30* | (2006.01) |
| *G02B 27/28* | (2006.01) |
| *G01S 7/02* | (2006.01) |

(52) U.S. Cl.
CPC .......... *G01S 13/931* (2013.01); *G01S 17/931* (2020.01); *G02B 5/3008* (2013.01); *G02B 5/3033* (2013.01); *G02B 27/288* (2013.01); *B60R 2001/1223* (2013.01); *B60Y 2400/3017* (2013.01); *B60Y 2410/10* (2013.01); *G01S 7/027* (2021.05); *G01S 2013/9327* (2020.01)

(58) Field of Classification Search
CPC ............. G01S 17/936; G01S 2007/027; G01S 2013/9371; B60R 1/12; B60R 13/005; B60R 13/04; B60R 2001/1223; G02B 5/3008; G02B 5/3033; G02B 27/288; B60Y 2400/3017; B60Y 2410/10; H01Q 1/3233; H01Q 1/42
See application file for complete search history.

(56) References Cited

U.S. PATENT DOCUMENTS

| | | | |
|---|---|---|---|
| 9,834,155 B2 | 12/2017 | Gong | |
| 10,107,894 B2 | 10/2018 | Cho et al. | |
| 10,641,453 B2 * | 5/2020 | Kwak | ..................... F21S 41/28 |
| 2004/0125023 A1 * | 7/2004 | Fujii | ........................ H01Q 1/40 |
| | | | 343/711 |
| 2007/0188678 A1 | 8/2007 | Kim et al. | |
| 2015/0177374 A1 * | 6/2015 | Driscoll | ................... H01Q 3/26 |
| | | | 342/22 |
| 2017/0299708 A1 * | 10/2017 | Cho | ........................ G01S 7/038 |
| 2017/0306684 A1 | 10/2017 | Baruco et al. | |
| 2018/0113331 A1 * | 4/2018 | Wang | ..................... G02F 1/0102 |
| 2018/0115059 A1 * | 4/2018 | Tokunaga | ............... G01S 7/032 |
| 2018/0238099 A1 | 8/2018 | Schatz | |
| 2018/0275269 A1 | 9/2018 | Lind et al. | |
| 2019/0128040 A1 | 5/2019 | Mitchell | |
| 2019/0162010 A1 | 5/2019 | Rafrafi et al. | |
| 2019/0204423 A1 * | 7/2019 | O'Keeffe | ................ G01S 17/89 |

FOREIGN PATENT DOCUMENTS

| | | | |
|---|---|---|---|
| CN | 103823212 A | | 5/2014 |
| CN | 106444997 A | | 2/2017 |
| CN | 107783219 A | | 3/2018 |
| CN | 107966704 A | | 4/2018 |
| JP | 2012098703 A | * | 5/2012 |
| JP | 2012202758 A | | 10/2012 |
| WO | 2018194920 A1 | | 10/2018 |

OTHER PUBLICATIONS

Hugo Cornelissen, "Polarized-light backlights for liquid-crystal displays" from https://spie.org/news/1363-polarized-light-backlights-for-liquid-crystal-displays?SSO=1, Nov. 12, 2008 (Year: 2008).*

"Lidar—Wikipedia.pdf" from https://web.archive.org/web/20171214092208/http://en.wikipedia.org:80/wiki/LIDAR (Year: 2017).*

JP_2012098703_A_I_translate.pdf—translation of JP_2012098703A (Year: 2012).*

Evaluation_of_reflectivity_of_metal.pdf (Zoltan Sarosi, Wolfgang Knapp, Andreas Kunz, Konrad Wegener, "Evaluation of reflectivity of metal parts by a thermo-camera", IWF, ETH Zurich, Switzerland, from https://www.researchgate.net/publication/236582531) (Year: 2010).*

* cited by examiner

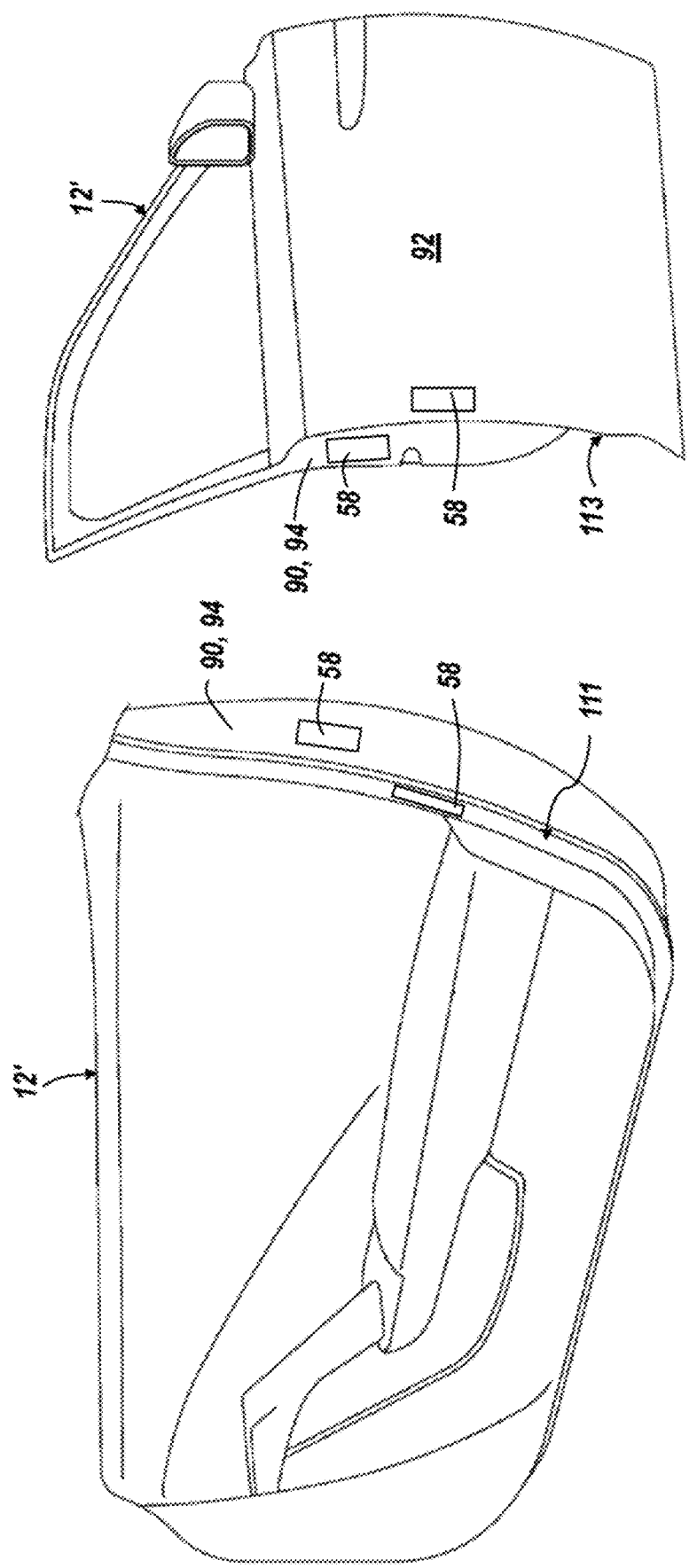

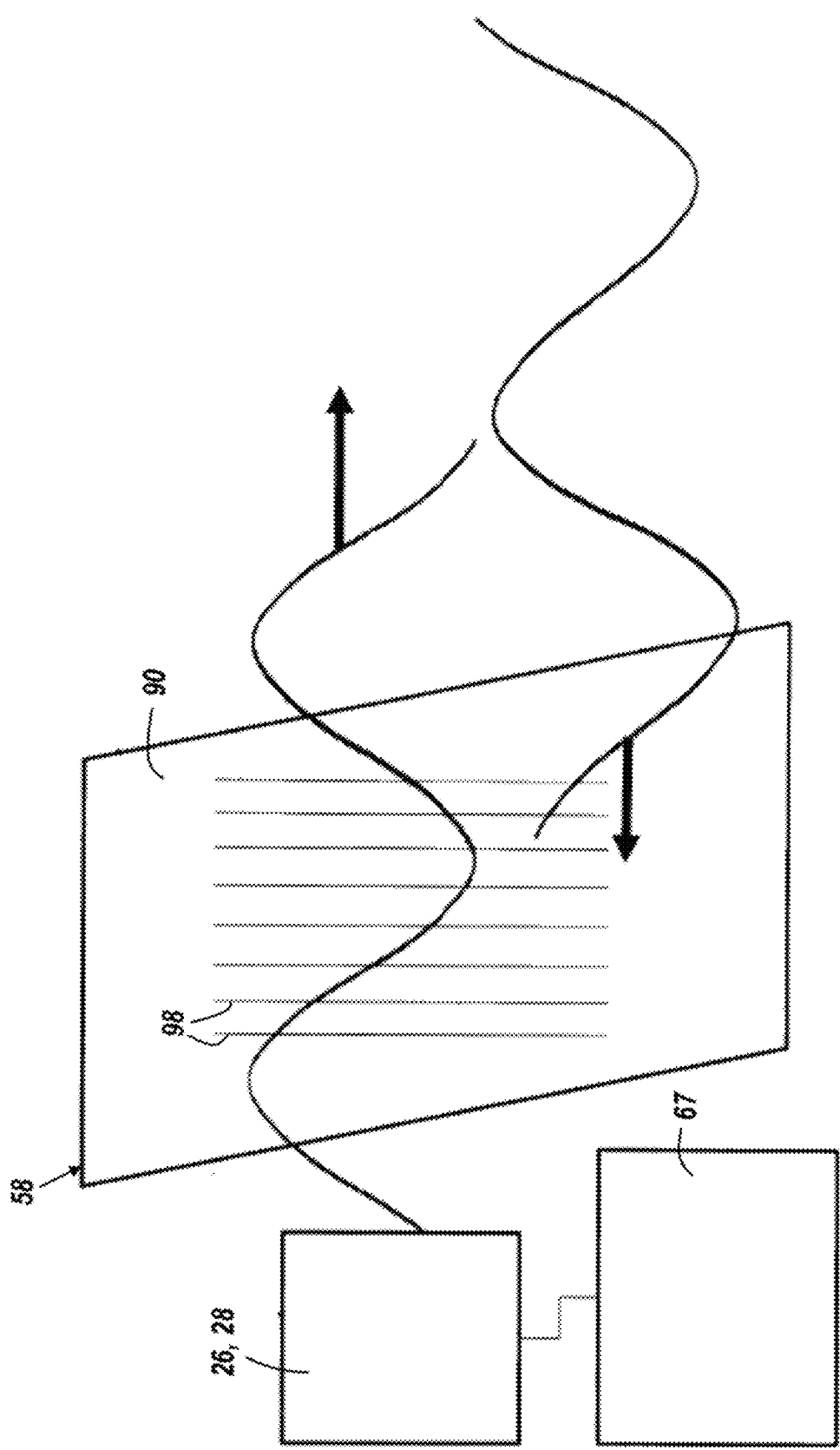

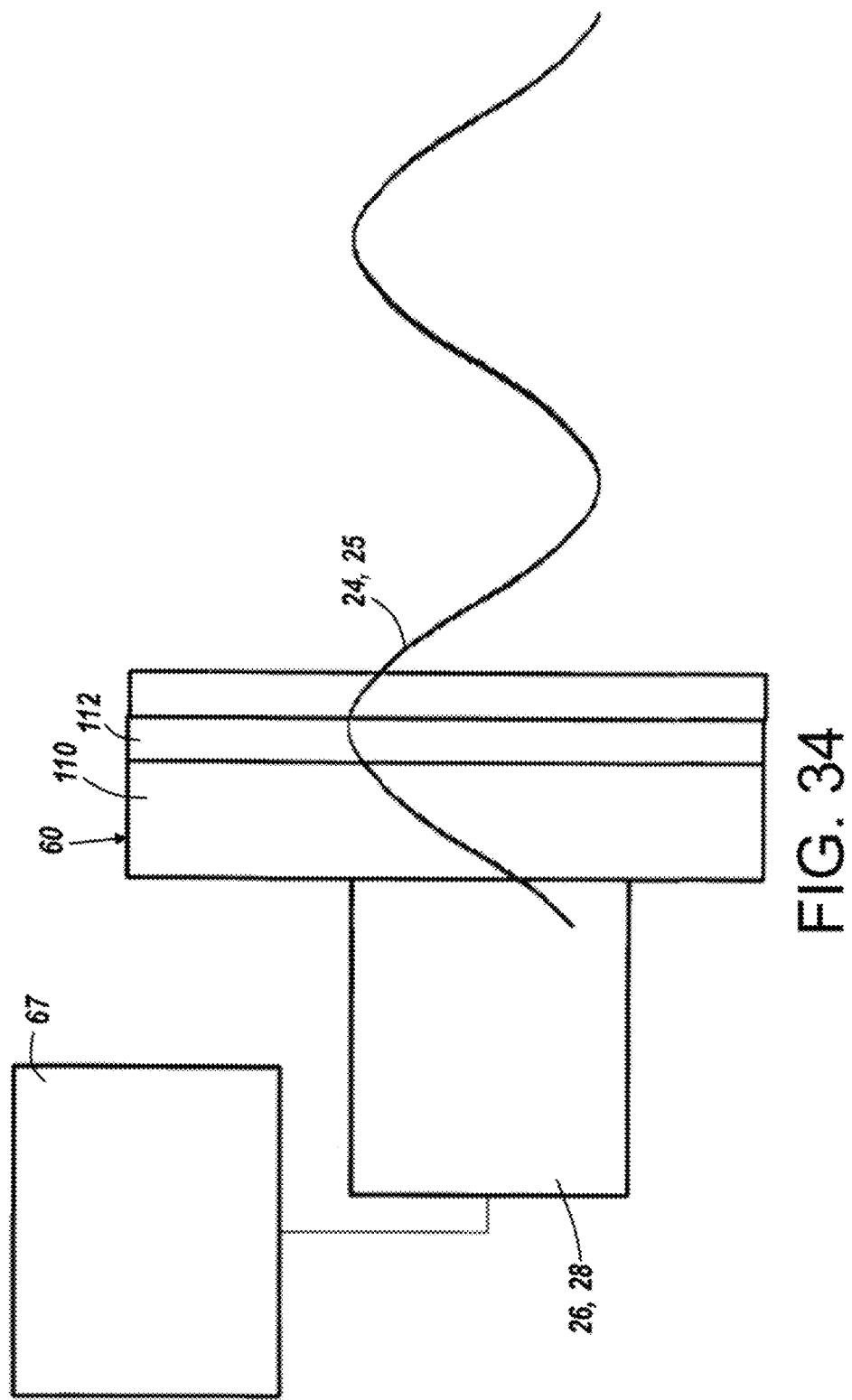

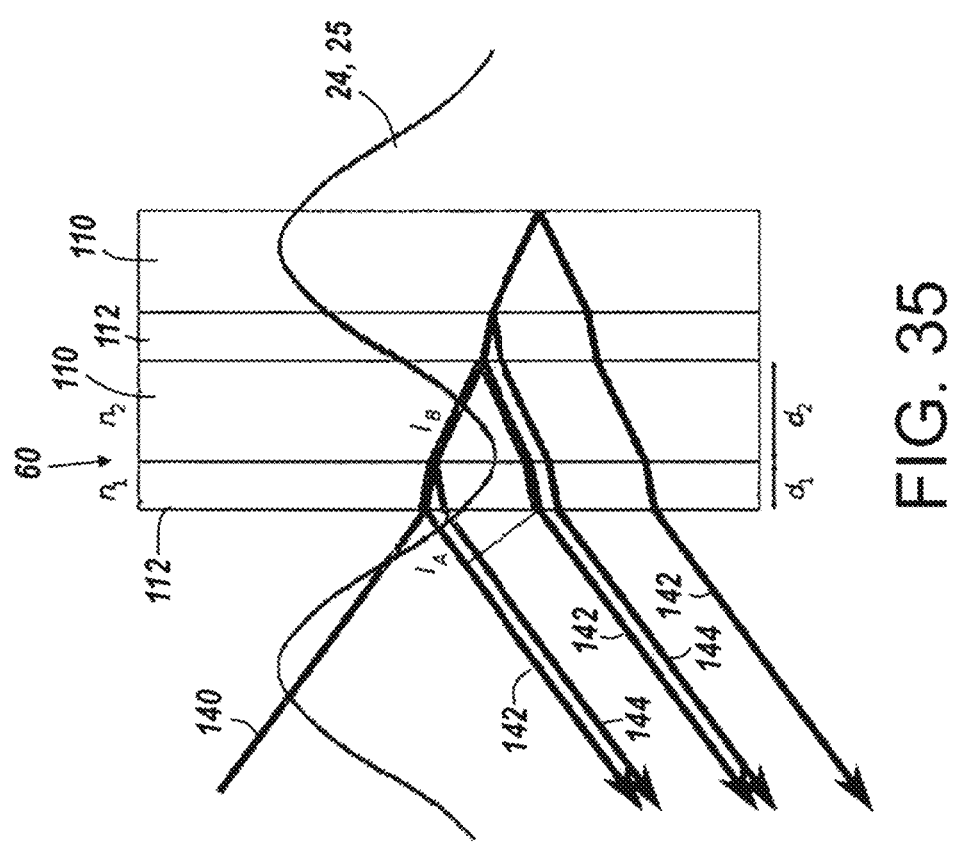

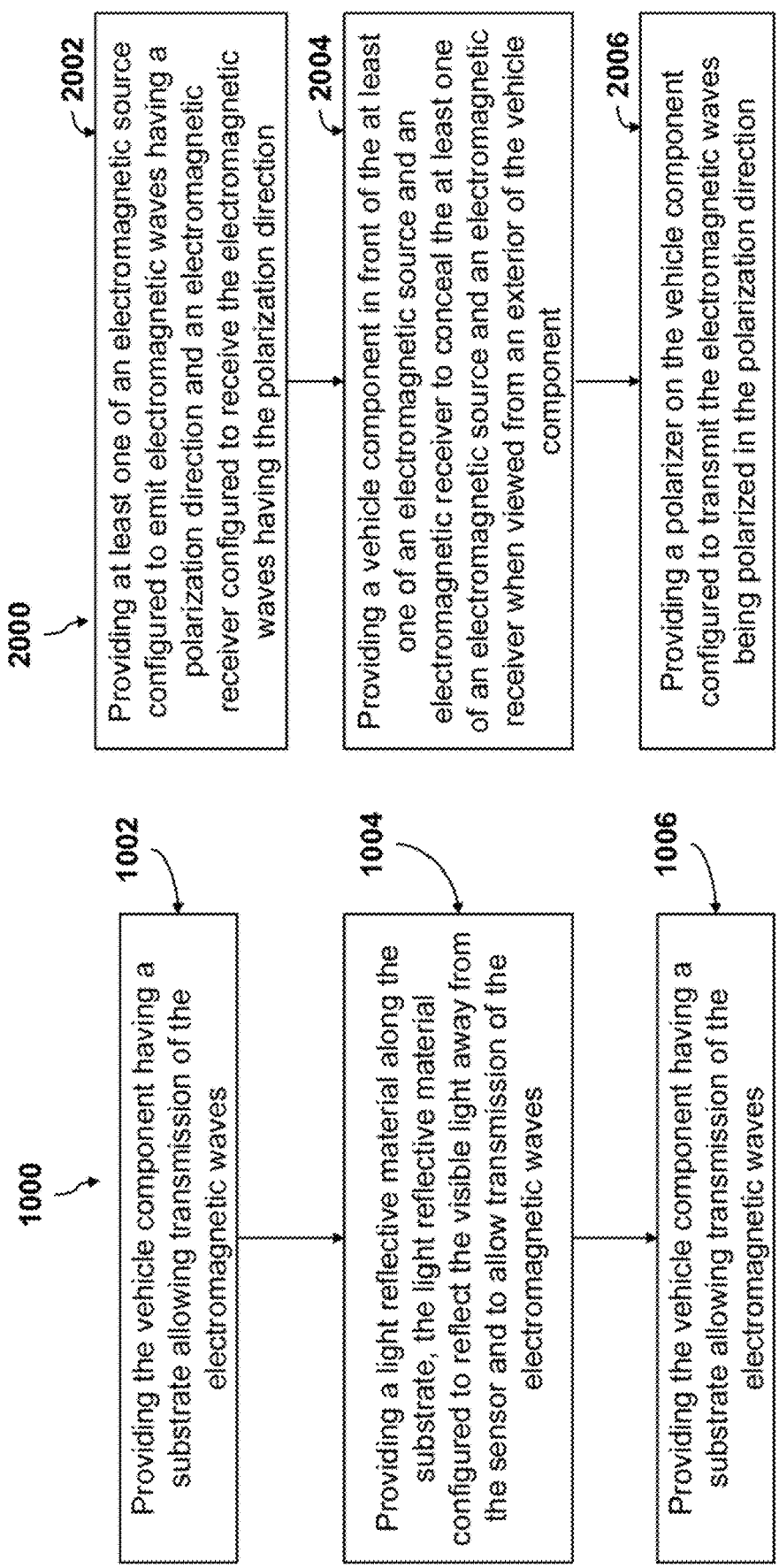

AUTOMOTIVE RADAR / LIDAR BEHIND REFLECTIVE SURFACES

CROSS-REFERENCE TO RELATED APPLICATIONS

This application claims the benefit of U.S. Provisional Application No. 62/725,480 filed Aug. 31, 2018. The entire disclosure of the above application is incorporated herein by reference.

FIELD

The present disclosure relates generally to a detection system and more specifically to a detection system utilizing radar and/or LIDAR behind a reflective surface.

BACKGROUND

This section provides background information related to the present disclosure which is not necessarily prior art.

Motor vehicles are increasingly being equipped with sensors that detect the environment and terrain surrounding the motor transmissive vehicle. For example, some vehicles include sensor systems that provide images of the terrain and/or other objects in the vicinity of the vehicle. Sensing systems utilizing radar have also been used to detect the presence and position of objects near the motor vehicle while the vehicle is moving. The signals and data generated by these sensor systems can be used by other systems of the motor vehicle to provide safety features such as vehicle control, collision avoidance, and parking assistance. Such sensing systems are generally used to assist the driver while he or she is driving the motor vehicle and/or to intervene in controlling the vehicle.

Nevertheless, while such sensing systems commonly rely on their ability to transmit and receive electromagnetic waves without such waves being blocked or significantly attenuated, vehicle styling considerations may demand that sensor assemblies be hidden or camouflaged in some way. Such styling considerations can become an increasing concern as the number of sensor assemblies rise on modern vehicles. Yet, the effectiveness of some sensor assemblies utilizing radar and/or LIDAR, for example, can be severely reduced or even nullified by their positioning behind solid sheet metal panels.

Thus, there is an increasing need for improved sensor assemblies and detection systems, while still meeting the demands of vehicle styling considerations. Furthermore, other desirable features and characteristics of the present disclosure will become apparent from the subsequent detailed description and the appended claims, taken in conjunction with the accompanying drawings and the foregoing technical field and background.

SUMMARY

This section provides a general summary of the present disclosure and is not intended to be interpreted as a comprehensive disclosure of its full scope or all of its features, aspects and objectives.

Accordingly, it is an aspect of the present disclosure to provide a sensor assembly for detecting an object. The sensor assembly includes at least one electromagnetic source configured to emit electromagnetic waves. The sensor assembly also includes at least one electromagnetic receiver configured to receive the electromagnetic waves after reflecting from the object and corresponding with a detection of the object in proximity to the sensor assembly. In addition, the sensor assembly includes a filter cover disposed adjacent to and covering the at least one electromagnetic source and the at least one electromagnetic receiver, with the filter cover being transmissive to the electromagnetic waves and reflective to visible light, thereby concealing the at least one electromagnetic source and the at least one electromagnetic receiver.

In accordance with another aspect, there is provided a method of forming an electromagnetic wave transparent portion of a vehicle component for a sensor configured to at least one of transmit and receive an electromagnetic waves and concealed by the vehicle component, the electromagnetic wave transparent portion allowing transmission of electromagnetic waves at least one of to and from the sensor and reflecting visible light impinging on an exterior surface of the vehicle component, the method including providing the vehicle component having a substrate allowing transmission of the electromagnetic waves, and providing a light reflective material along the substrate, the light reflective material configured to reflect the visible light away from the sensor and to allow transmission of the electromagnetic waves.

In accordance with another aspect, there is provided a metallic vehicle panel for a vehicle formed from at least one panel of sheet metal, the metallic vehicle panel including a sensor port formed in the at least one panel of sheet metal, the sensor port including a plurality of gaps being parallel and spaced apart from one another transmissive to electromagnetic waves.

In accordance with another aspect, there is method of assembling a sensor system for a vehicle including providing at least one of an electromagnetic source configured to emit electromagnetic waves having a polarization direction and an electromagnetic receiver configured to receive the electromagnetic waves having the polarization direction, providing a vehicle component in front of the at least one of an electromagnetic source and an electromagnetic receiver to conceal the at least one of an electromagnetic source and an electromagnetic receiver when viewed from an exterior of the vehicle component, and providing a polarizer on the vehicle component configured to transmit the electromagnetic waves being polarized in the polarization direction.

These and other aspects and areas of applicability will become apparent from the description provided herein. The description and specific examples in this summary are intended for purpose of illustration only and are not intended to limit the scope of the present disclosure.

DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the following written description when considered in combination with the appended drawings, in which.

Figure 8:
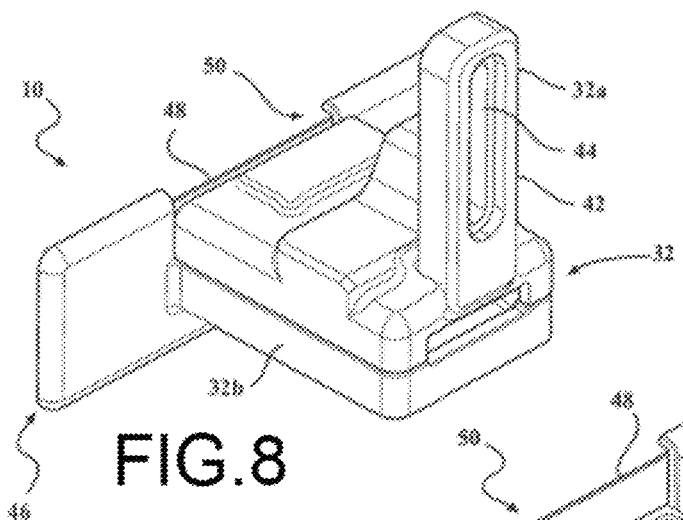
Figure 8A:
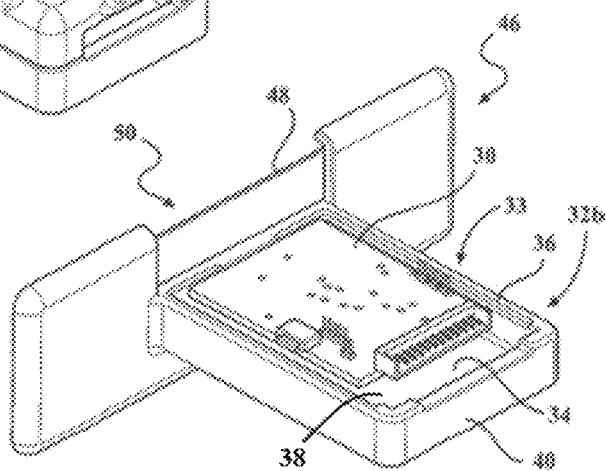
Figure 8B:
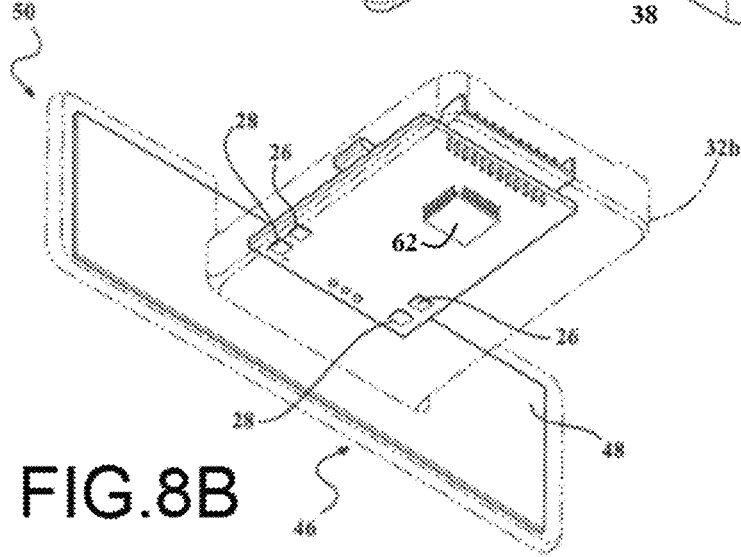
Figure 9:
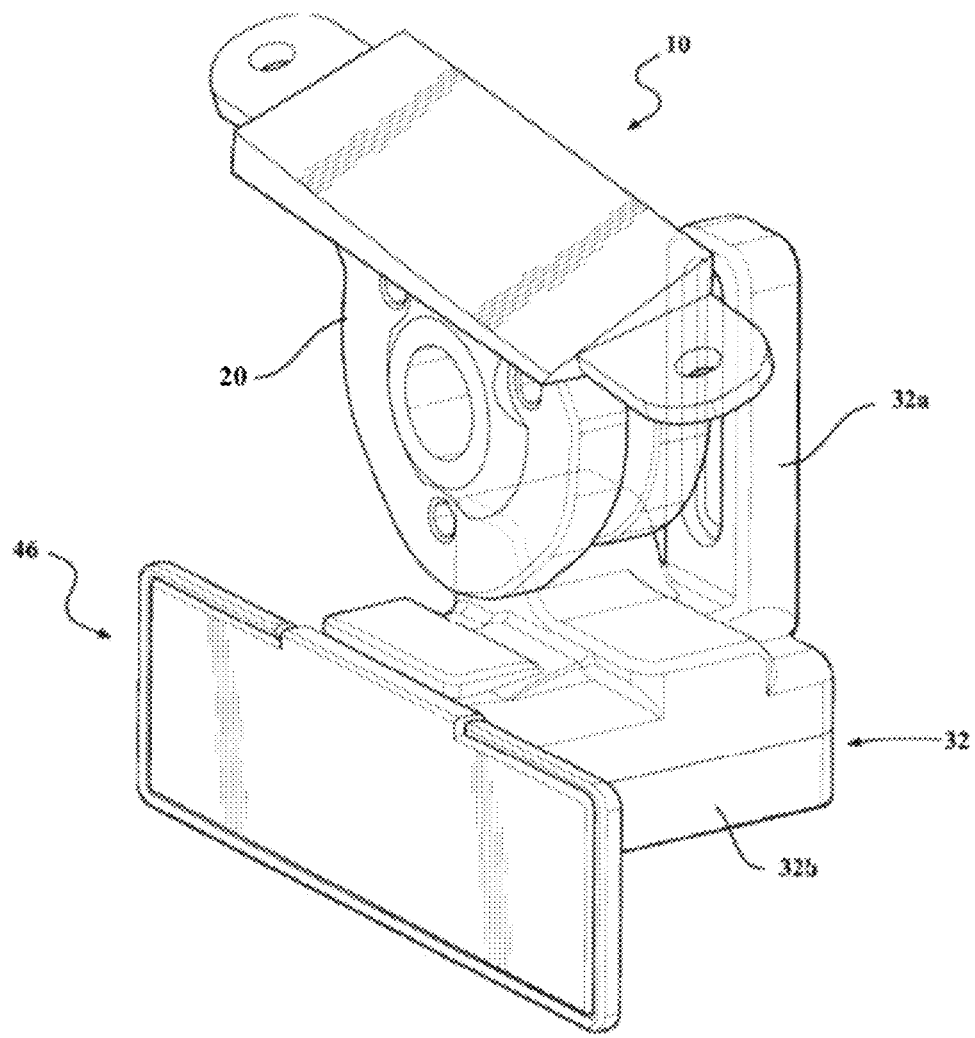
Figure 10:
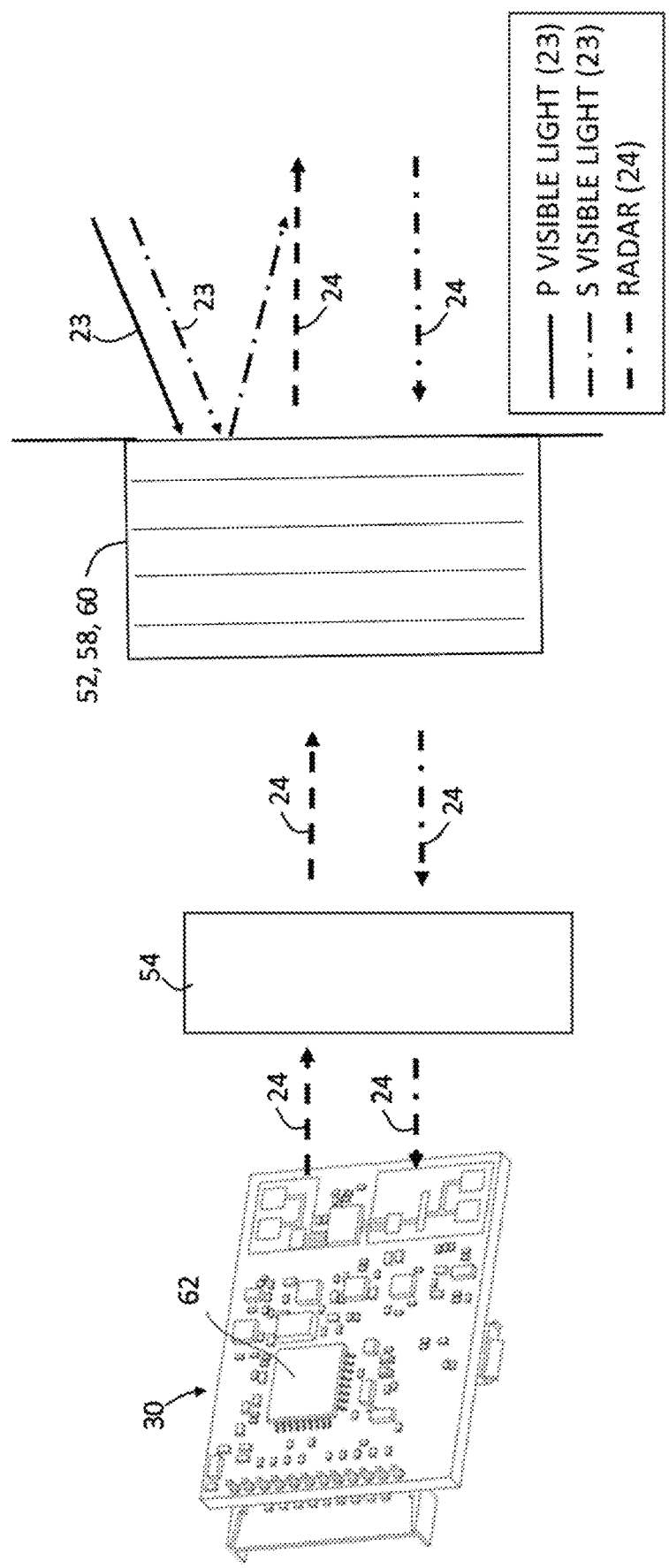
Figure 11:
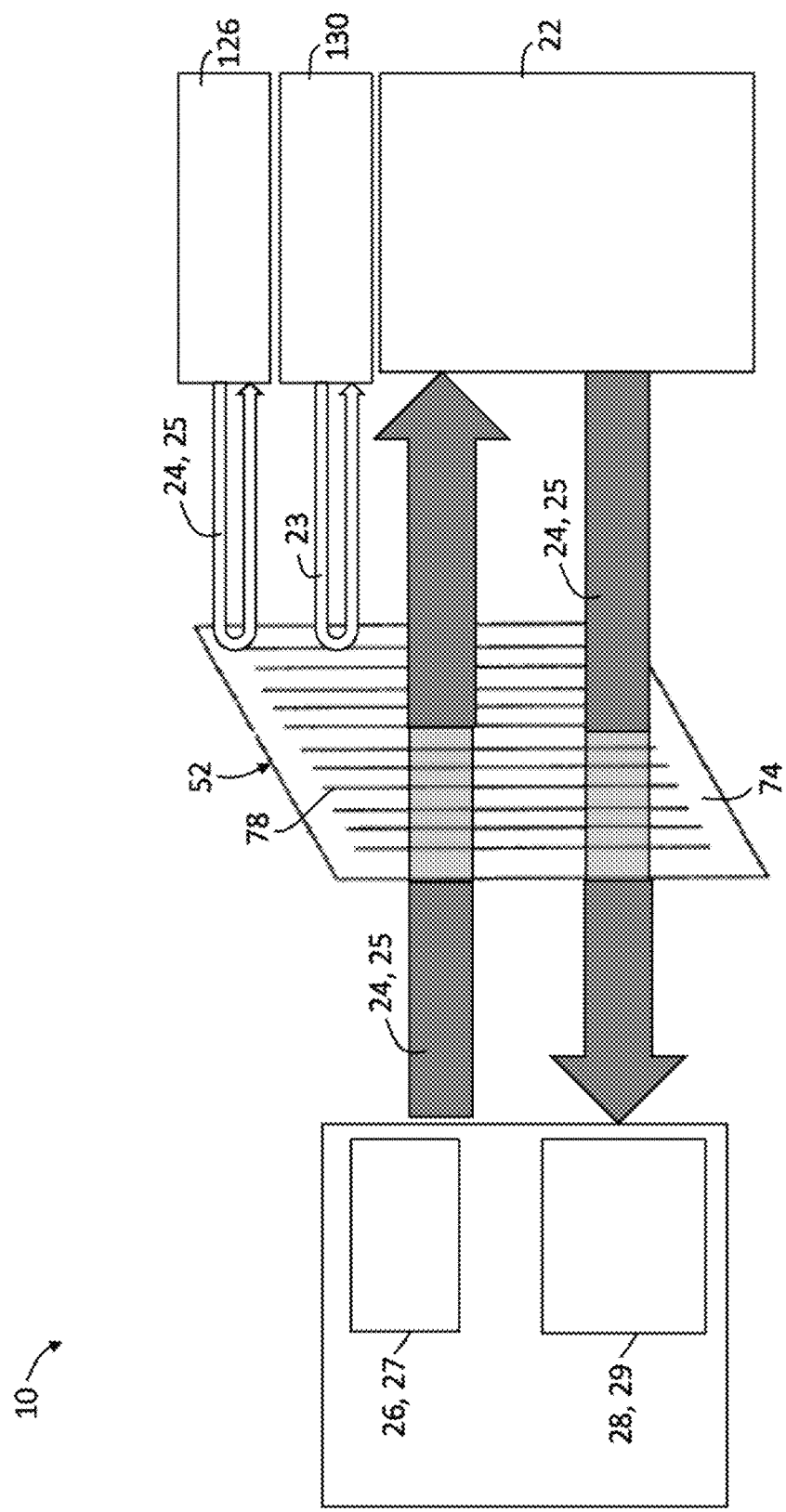
Figure 13:
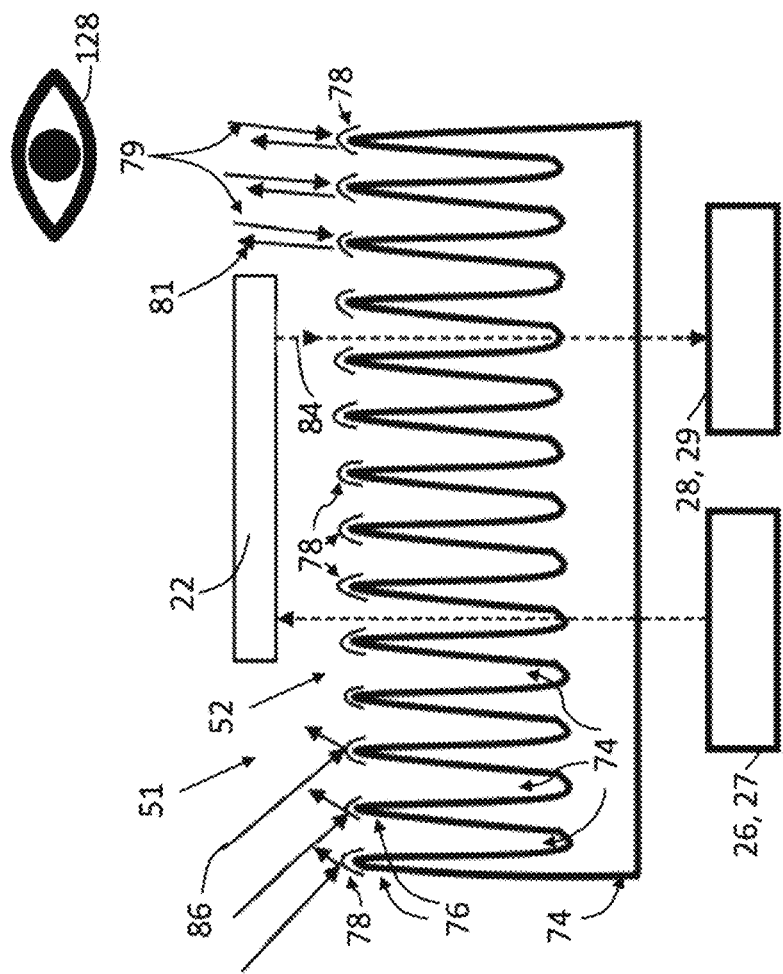
Figure 12:
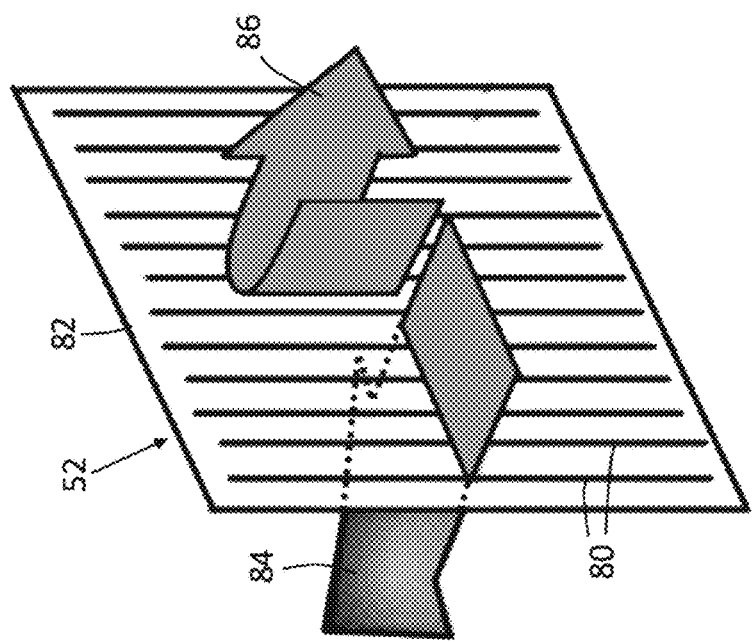
Figure 14:
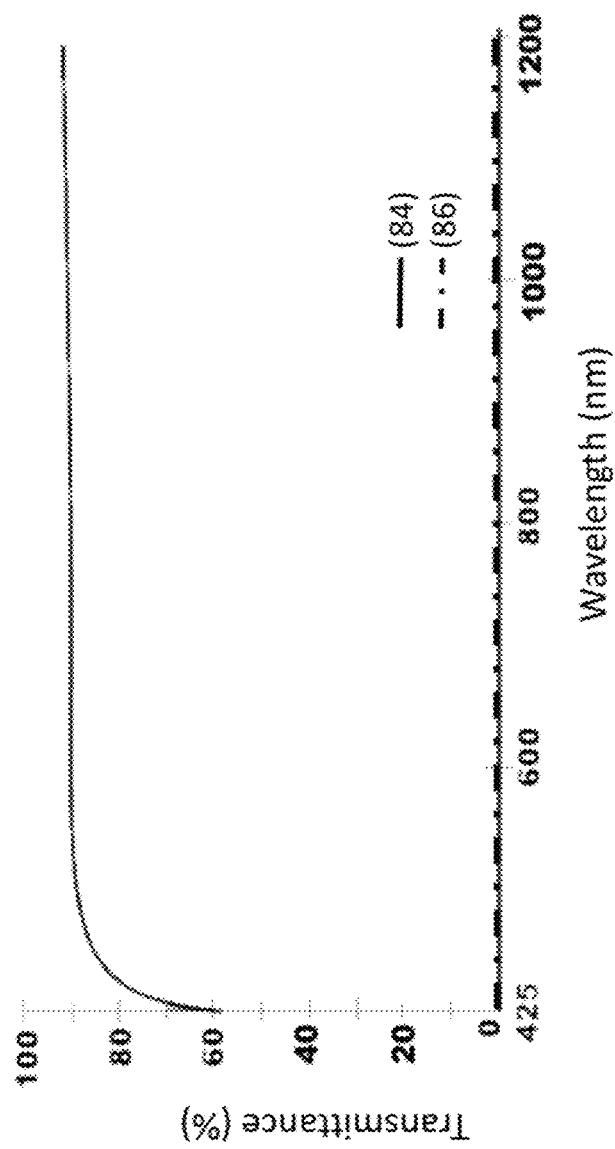
Figure 20:
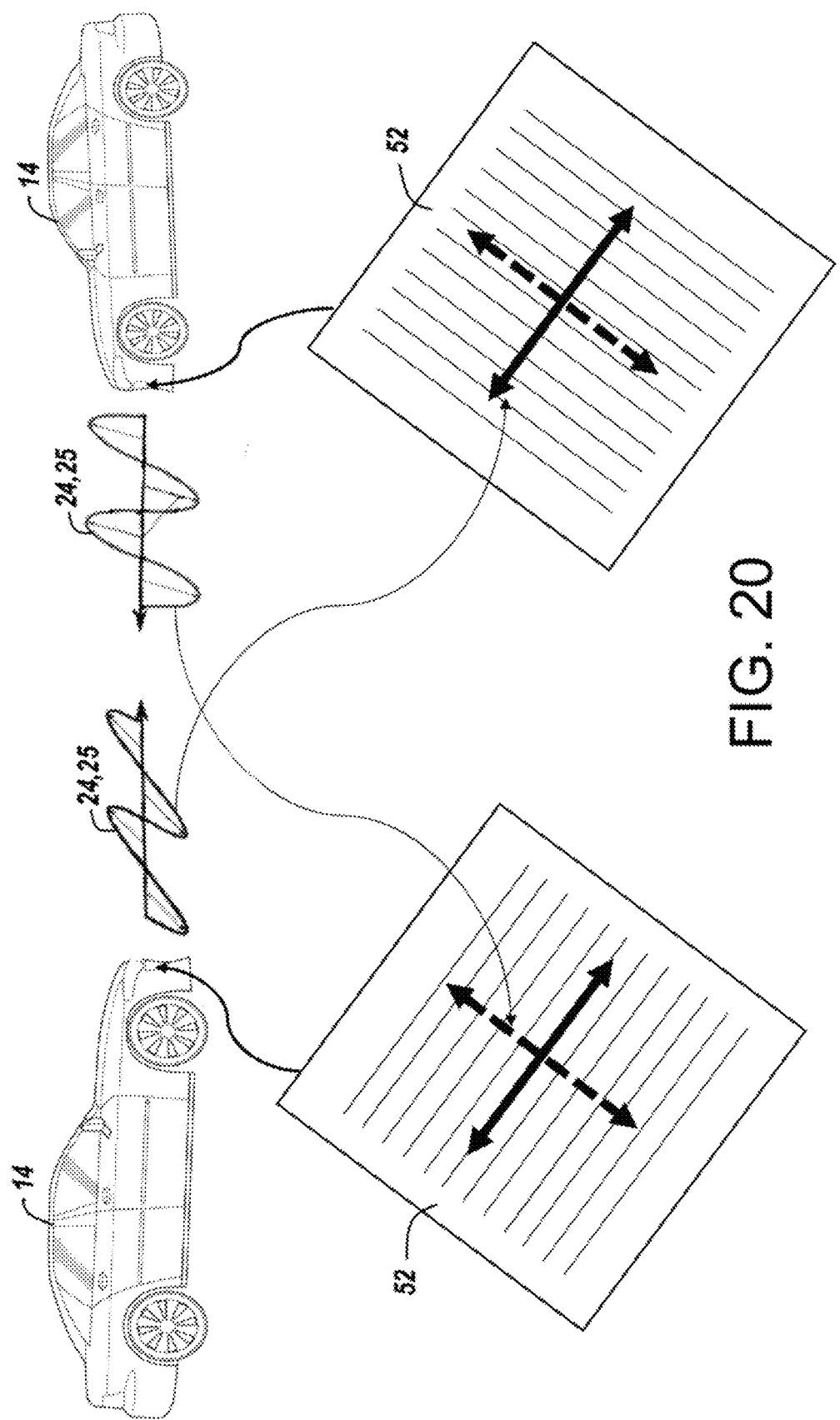
Figure 21:
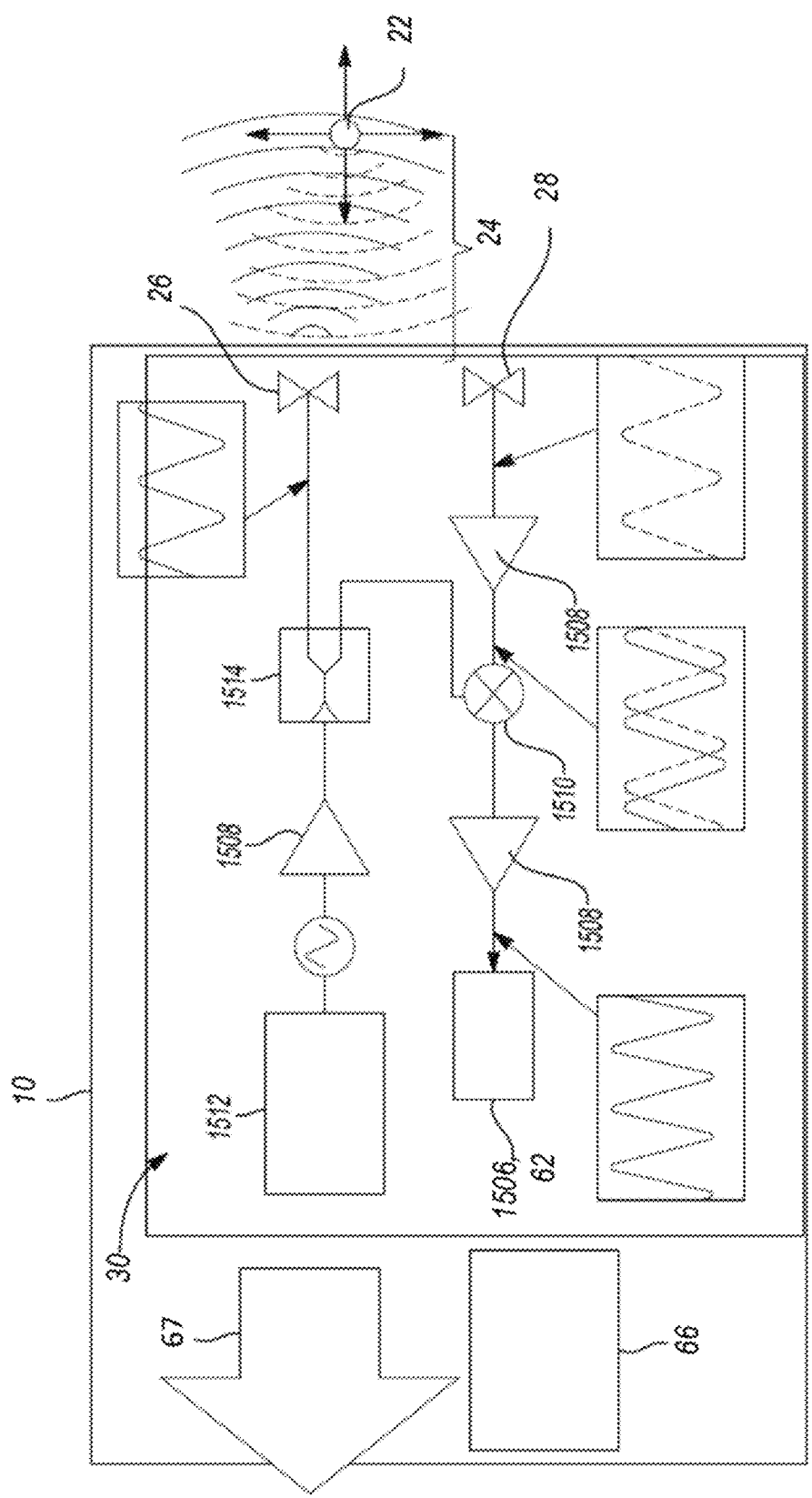
Figure 22:
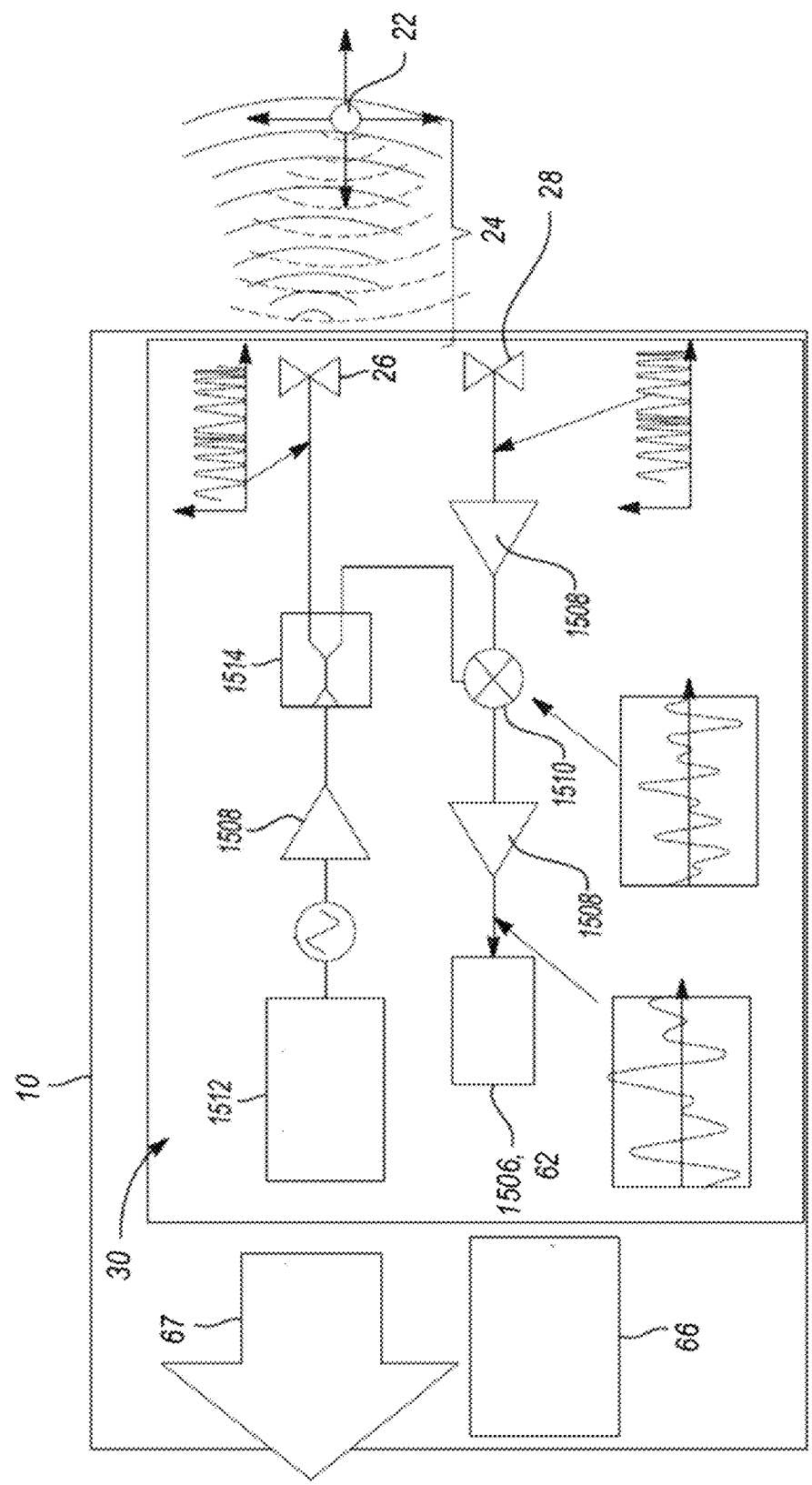
Figure 23:
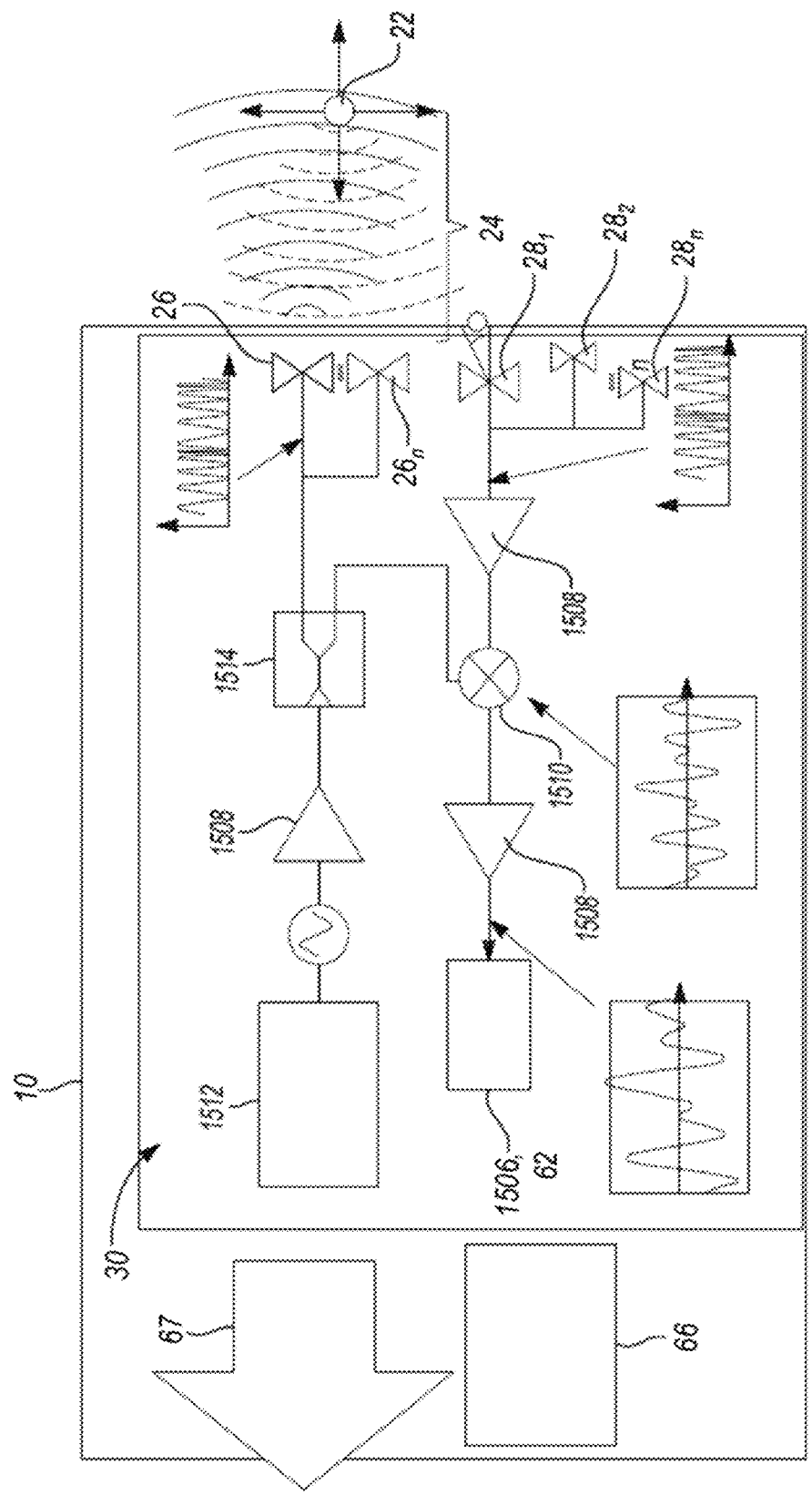
Figure 24:
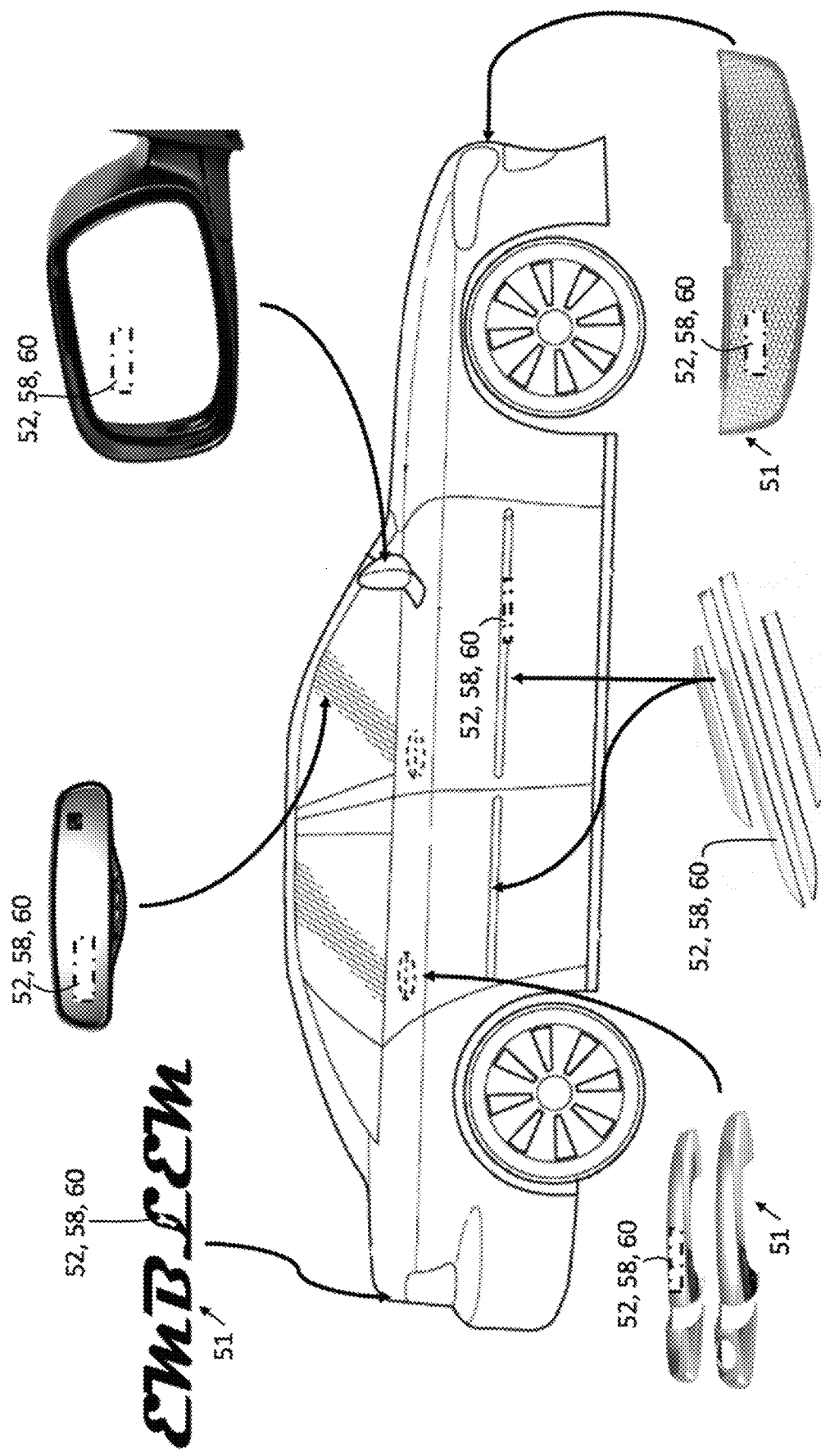
Figure 25:
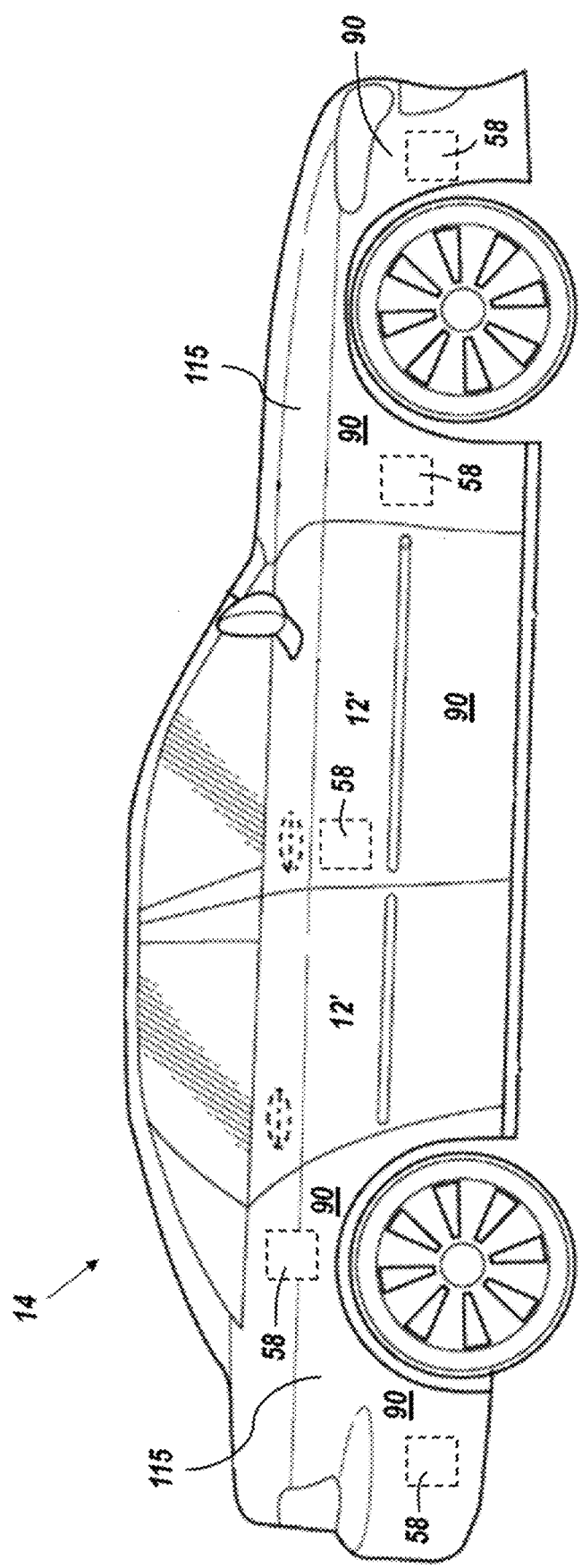
Figure 31:
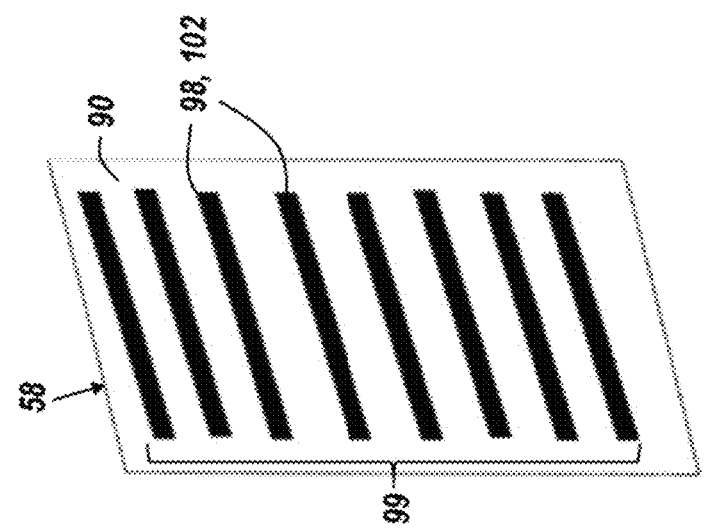
Figure 30:
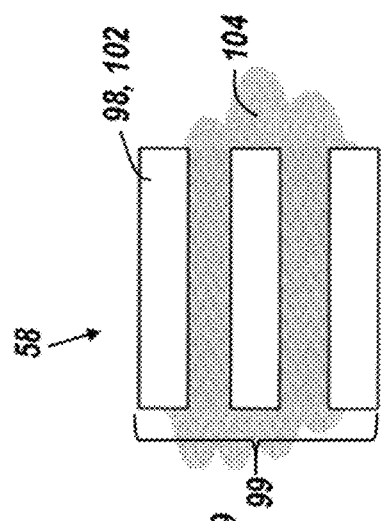
Figure 33:
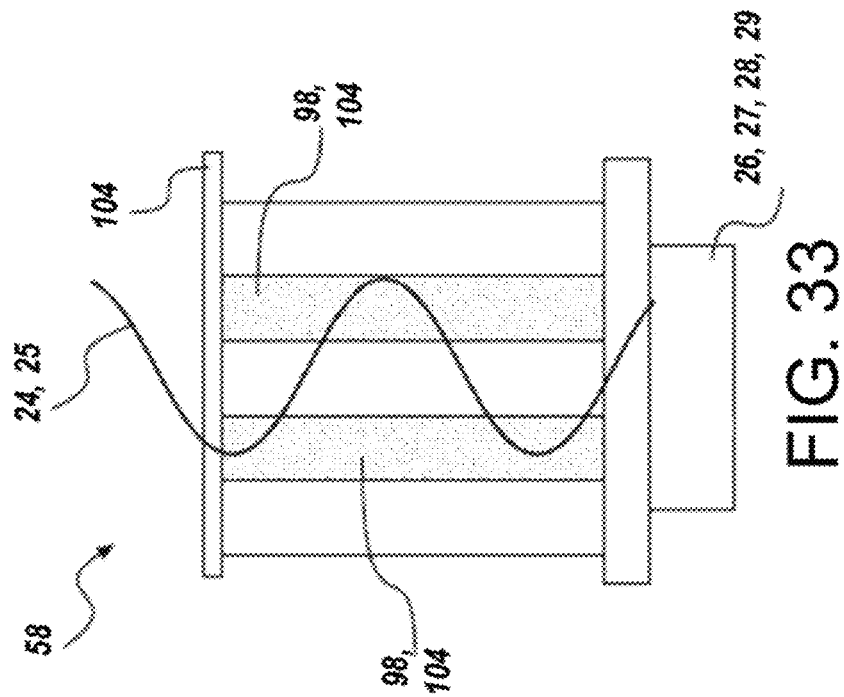
Figure 32:
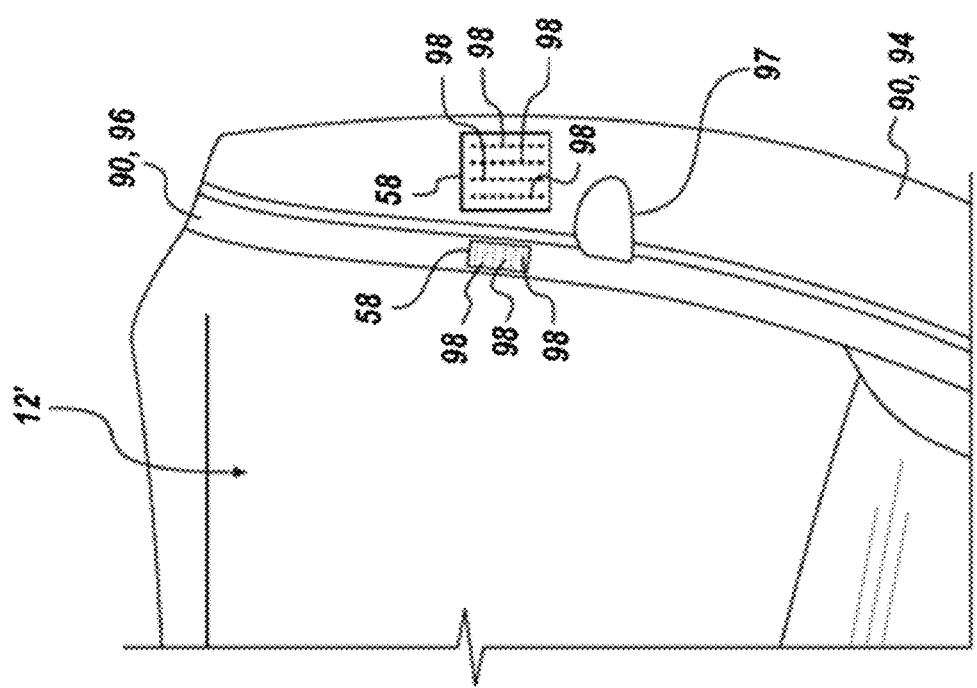

FIGS. 8, 8A, and 8B illustrate an upper and lower housing of the sensor assembly according to aspects of the disclosure;

FIG. 9 illustrates the sensor assembly according to aspects of the disclosure;

FIG. 10 illustrates operation of the sensor assembly according to aspects of the disclosure;

FIG. 11 illustrates details of a reflective polarizer of the sensor assembly according to aspects of the disclosure;

FIGS. 12-13 illustrates details of a reflective polarizer of the sensor assembly according to aspects of the disclosure;

FIG. 14 illustrates transmittance for polarized EM radiation that is parallel and crossed to a reflective polarizer of the sensor assembly according to aspects of the disclosure;

FIGS. 15-19 illustrates various arrangements of the reflective polarizer of the sensor assembly according to aspects of the disclosure;

FIG. 20 illustrates an arrangement of the reflective polarizer in two vehicles facing one another according to aspects of the disclosure;

FIGS. 21-23 are block diagrams illustrating sensor assemblies utilizing radar according to aspects of the disclosure;

FIG. 24 illustrates various possible locations on the vehicle at which the sensor assembly can be located according to aspects of the disclosure;

FIGS. 25-27 illustrate sensor ports formed in sheet metal of the vehicle according to aspects of the disclosure;

FIGS. 28-31 illustrate steps of a method of forming the sensor port in the sheet metal of the vehicle according to aspects of the disclosure FIG. 32 illustrates a portion of a door of a motor vehicle according to aspects of the disclosure;

FIG. 33 is a schematic diagram illustrating a radar transmissive region according to aspects of the disclosure;

FIGS. 34-35 show schematic diagrams illustrating a dielectric mirror used in the sensor assembly according to aspects of the disclosure;

FIG. 36 illustrates a flow chart of a method of forming an electromagnetic wave transparent portion of a vehicle component for a sensor concealed by the vehicle component, in accordance with an illustrative embodiment; and FIG. 37 illustrates a flow chart of a method of assembling a sensor system for a vehicle, in accordance with an illustrative embodiment.

DETAILED DESCRIPTION

In the following description, details are set forth to provide an understanding of the present disclosure. In some instances, certain circuits, structures, steps, and techniques have not been described or shown in detail in order not to obscure the disclosure.

In general, the present disclosure relates to a detection system of the type well-suited for use in many applications. More specifically, a non-contact sensor assembly capable of detecting objects or users for a motor vehicle and method of forming a sensor port in sheet metal are disclosed herein. The sensor assembly and method of this disclosure will be described in conjunction with one or more example embodiments. However, the specific example embodiments disclosed are merely provided to describe the inventive concepts, features, advantages and objectives will sufficient clarity to permit those skilled in this art to understand and practice the disclosure.

Referring to the Figures, wherein like numerals indicate corresponding parts throughout the several views, an embodiment of a sensor assembly 10 for detecting an object (not shown in FIG. 1) is disclosed.

Figure 1:
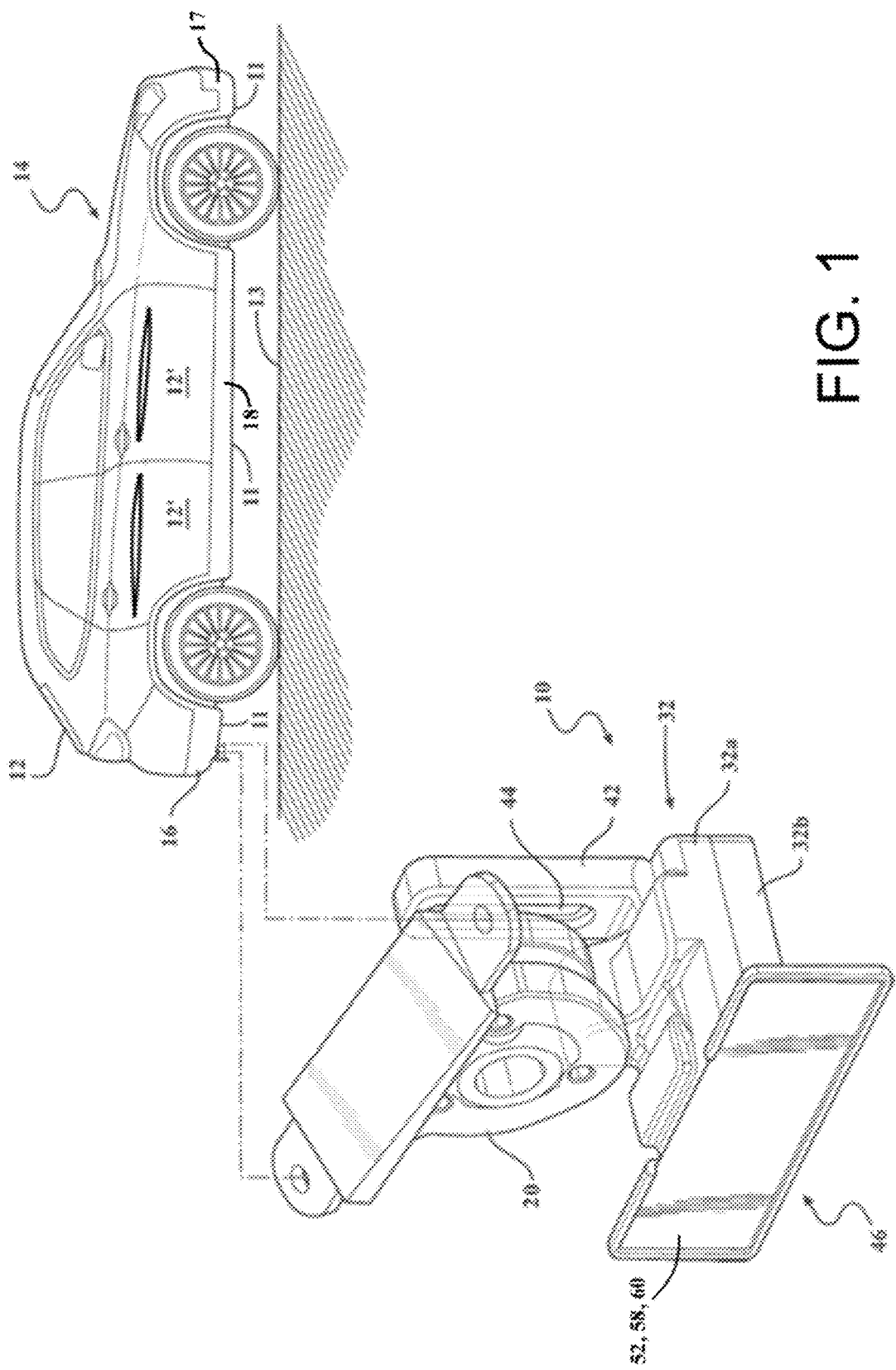
FIG. 1 illustrates a sensor assembly attached to a vehicle according to aspects of the disclosure.

The sensor assembly 10 is shown in FIG. 1 in an example embodiment for a closure panel, such as a lift gate 12 and/or door 12' which may be pivotally attached to a vehicle body 11 of a vehicle 14, for example by hinges or other connections such as electromagnetic rails, rollers, or sliders or the like. Closure panel 12 and vehicle body 11 may be formed from sheet metal panels, which may be formed by stamping and connected together by welding or other techniques as commonly known in the art, and which normally cannot be penetrated by electromagnetic waves, such as radar. The sensor assembly 10 may be provided as an integral component of an existing vehicle component or fixed as a separate component to a frame member or other feature of the vehicle 14, which can be naturally positioned at a desired location and orientation relative to the closure panel 12, 12' to take advantage of the detection radar pattern and range (i.e., approximately 5 m). It is to be recognized that a single sensor assembly 10 can be used for multiple closure panels 12, 12'; however, using more than one sensor assembly 10 to obtain a desired detection pattern is also contemplated herein. The sensor assembly 10 for the lift gate 12 can be disposed on, behind or adjacent a rear bumper 16, and the sensor assembly 10 can be disposed on, behind or adjacent a side beam (door sill) 18, shown as being beneath the door sill 18. In some embodiments, the sensor assembly 10 may be installed within or near a front bumper 17 or fascia of the vehicle 14.

The sensor assembly 10 can be adapted to be disposed in any desired location of the vehicle 14 to provide a desired detection pattern for the intended application, as discussed further hereafter. To facilitate positioning the sensor assembly 10 in a precise orientation to provide a precisely located detection pattern, the sensor assembly 10 can be fixed to pivotal member, shown in FIG. 1 as a spherical bearing member 20, sometimes referred to as bearing pillow block, by way of example and without limitation, thereby allowing the sensor assembly 10 to be pivoted about multiple X, Y, and/or Z axes and fixed in the desired position. Optionally, an actuator and rotatable assembly (both not shown) may be provided so as to adaptively rotate the sensor assembly 10 to vary the detection zone (e.g. vary the radar pattern) based on the mode of operation of the sensor assembly 10, or the terrain surrounding the vehicle 14.

As also shown in FIG. 1, an example embodiment of the sensor assembly 10 includes a housing 32 comprising an upper housing 32a and a lower housing 32b. Further, the upper and/or lower housing 32a, 32b can be configured having attachment features, with the upper housing 32a being shown, by way of example and without limitation, as having such an attachment feature in the form of an upstanding arm or boss 42. The boss 42 has a through opening, shown as an elongate through slot 44, to facilitate attachment of the sensor assembly 10 to the vehicle 14, such as via the pivotal spherical bearing member 20. The housing 32 also includes a cover flange 46 holding a filter cover 52, 58, 60.

Figure 2:
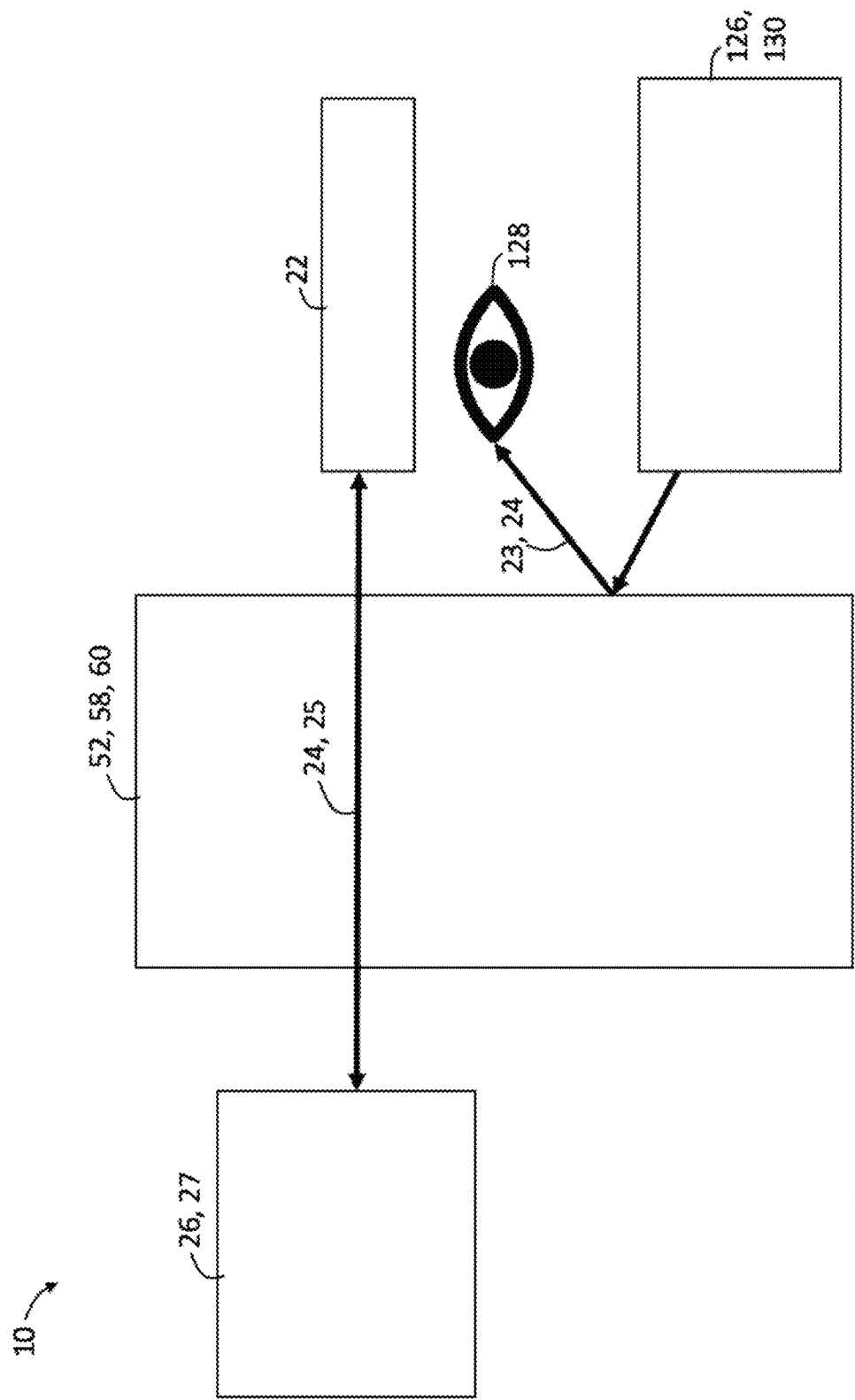
FIG. 2 illustrates a block diagram showing a sensor assembly according to aspects of the disclosure.
Figure 3:
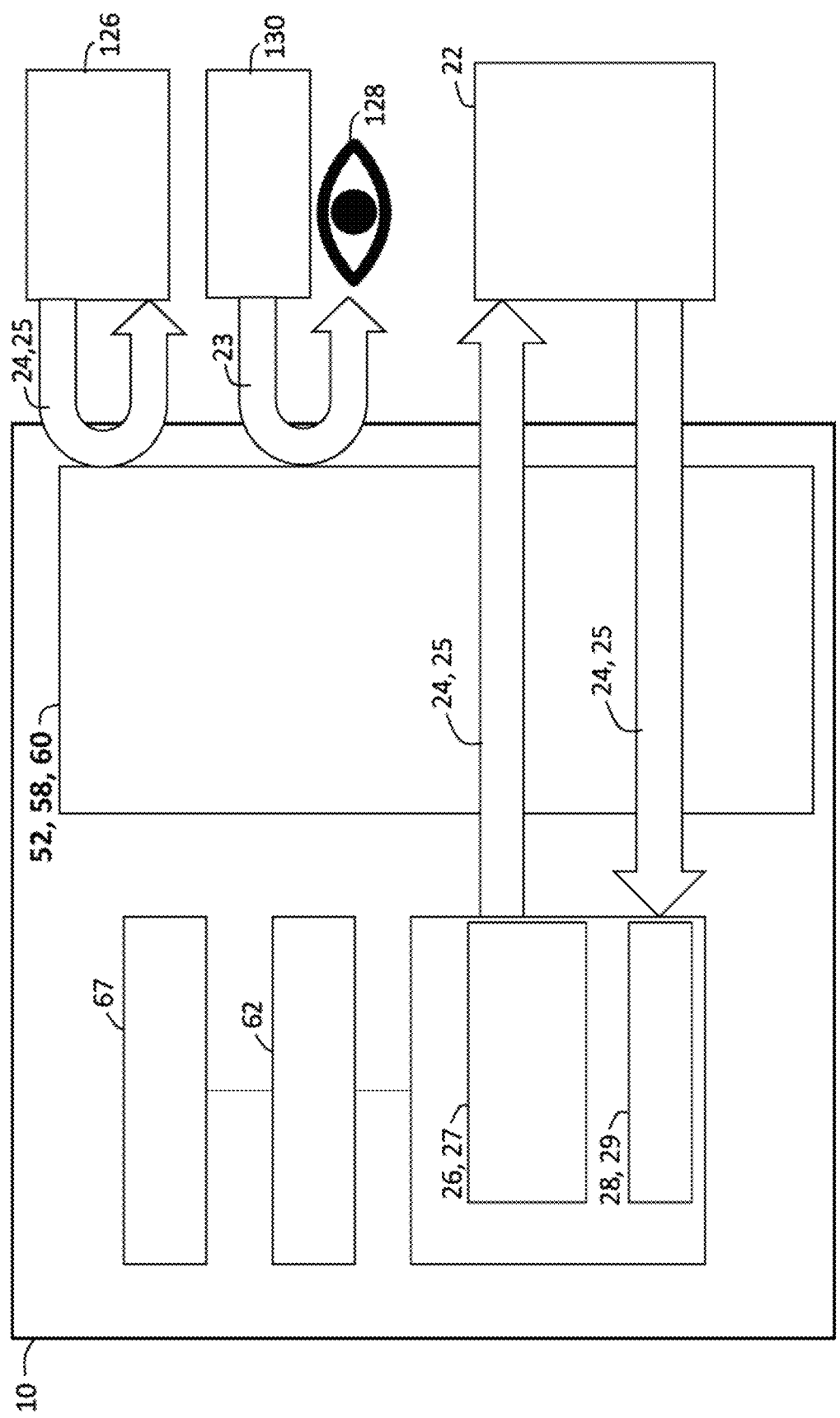
FIG. 3 illustrates a block diagram showing a sensor assembly according to aspects of the disclosure.

As best shown in FIGS. 2 and 3, the sensor assembly 10 includes at least one electromagnetic (EM) source 26, 27 for emitting electromagnetic waves 24, 25, which may be called EM waves, for short. The sensor assembly 10 also includes at least one electromagnetic receiver 28, 29 for receiving the electromagnetic waves 24, 25 after reflecting from the object 22 and corresponding with a detection of the object 22 in proximity to said sensor assembly 10. In an alternate configuration, the sensor assembly 10 may include one of the at least one electromagnetic receiver 28, 29 and the at least one electromagnetic (EM) source 26, 27. Such received electromagnetic waves 24, 25 may be reflected from an object 22, such as a hand, foot, person, or body part of such person for example and processed by a controller or sensor microprocessor 62 as will be described in more details herein below as part of a gesture recognition system involving extracting and authenticating a gesture of the object 22 for actuating a vehicle system, such as controlling the unlock/lock of a latch of closure panel 12, for controlling an actuator for moving the closure panel 12, or as part of an obstacle detection or ADAS system, as examples. Examples of such gesture and obstacle detection and actuation systems which may be adapted with the sensor assembly 10 as described herein are commonly owned US patent application No. 20190162010 entitled "Radar detection system for non-contact human activation of powered closure member", US patent application No. 20180238099 entitled "Power swing door with virtual handle gesture control", US patent application No. 20190128040 entitled "Multifunction radar based detection system for a vehicle liftgate", US patent application No. 20170306684A entitled "Non-contact obstacle detection system for motor vehicles", the entire contents of which are incorporated herein by reference.

Furthermore, the sensor assembly 10 also includes a filter cover 52, 58, 60 disposed adjacent to and covering the at least one electromagnetic source 26, 27 and the at least one electromagnetic receiver 28, 29 and is transmissive to the electromagnetic waves 24, 25 and reflective to visible light. For example, visible light may be reflected into light 81 having a full reflectance spectrum, or less than full reflectance spectrum, and with different spectral profiles. In other words, the filter cover 52, 58, 60 is configured to allow the electromagnetic waves 24, 25 to pass therethrough while reflecting visible light. The filter cover 52, 58, 60 is configured to allow the electromagnetic waves 24, 25 to pass therethrough, and for example without attenuation. The at least one electromagnetic source 26, 27 is configured to polarize the electromagnetic waves 24, 25 in a first direction, or first state. According to an aspect, the filter cover 52, 58, 60 comprises a reflective polarizer 52 configured to allow passage of the electromagnetic waves 24, 25 that are polarized in the first direction and have a first spectral profile. In contrast, the reflective polarizer 52 rejects electromagnetic waves 24, 25 that are polarized in a second direction, or second state, different than the first direction and have a second spectral profile different than the first spectral profile. For example, electromagnetic waves 24, 25, such as radio waves 24 from an external EM source 126 may be reflected off of the filter cover 52, 58, 60 and back in the direction of the external EM source 126. Additionally, visible light 23 from an external light source 130 may be reflected off of the filter cover 52, 58, 60 and back in the direction of a viewer 128, thus concealing the sensor assembly 10, or at least the internal components thereof, from view of the viewer 128.

Figure 4:
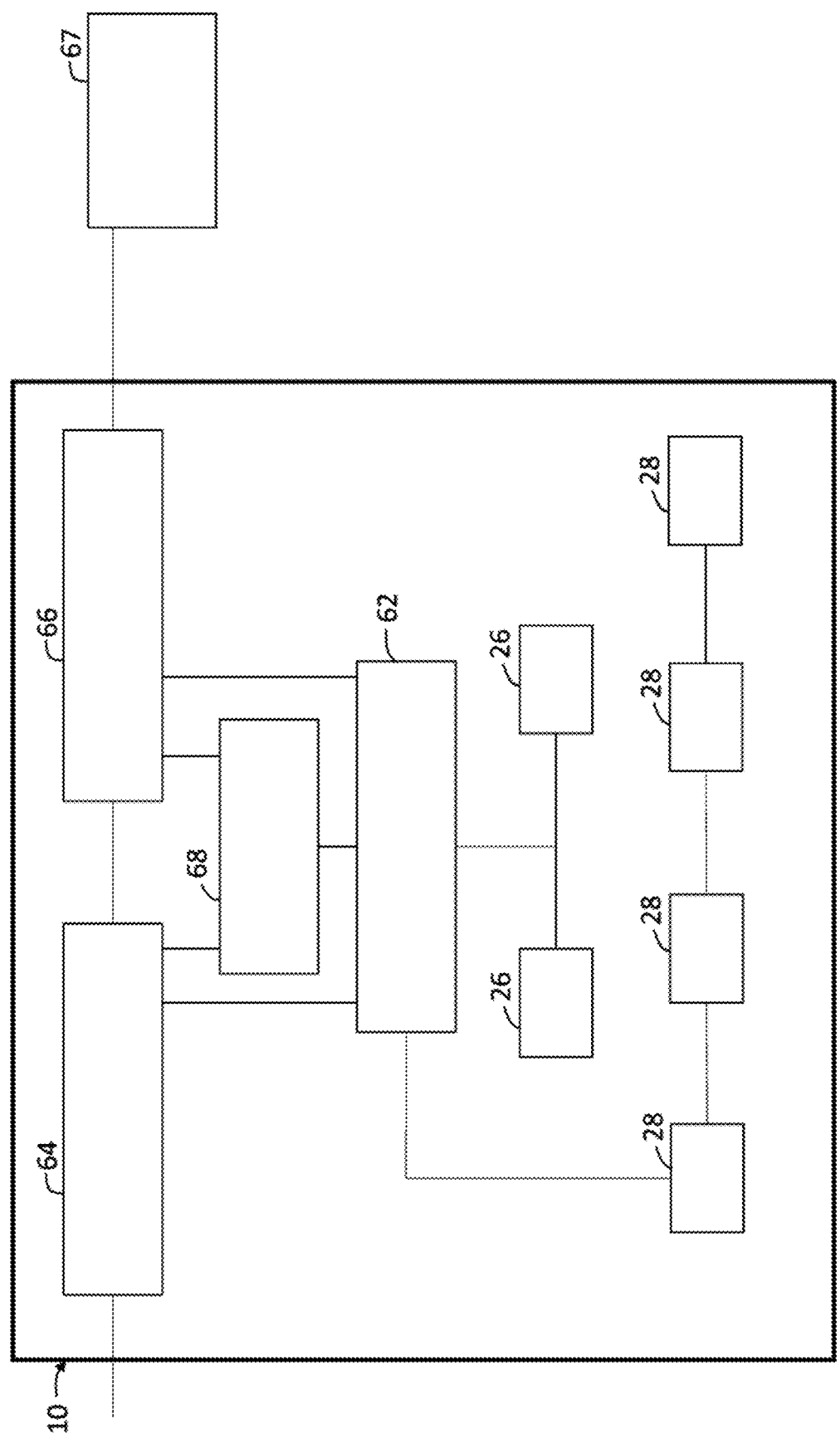
FIG. 4 illustrates a block diagram showing a sensor assembly according to aspects of the disclosure.

The sensor assembly 10 additionally includes a controller or sensor microprocessor 62. As best shown in FIG. 4, the sensor microprocessor 62 is electrically coupled to the at least one electromagnetic source 26, 27 and the at least one electromagnetic receiver 28, 29 and is configured to control emission of the electromagnetic waves 24, 25 using the at least one electromagnetic source 26, 27 and to detect the object 22 in proximity, such as a short range proximity for obstacle detection or gesture detection as determined by the controller or sensor microprocessor 62, or medium range or long range proximity for lane departure or ADAS ("Advanced driver-assistance systems") as determined by the controller or sensor microprocessor 62 as examples, to the sensor assembly 10 using the at least one electromagnetic receiver 28, 29. The at least one electromagnetic source 26, 27 includes a plurality of radar transmitting antennas 26 and the at least one electromagnetic receiver 28, 29 includes a plurality of radar receiving antennas 28 (i.e., the electromagnetic waves 24, 25 utilized in such a case are radio waves 24, which may also be called radar waves 24).

Figure 5:
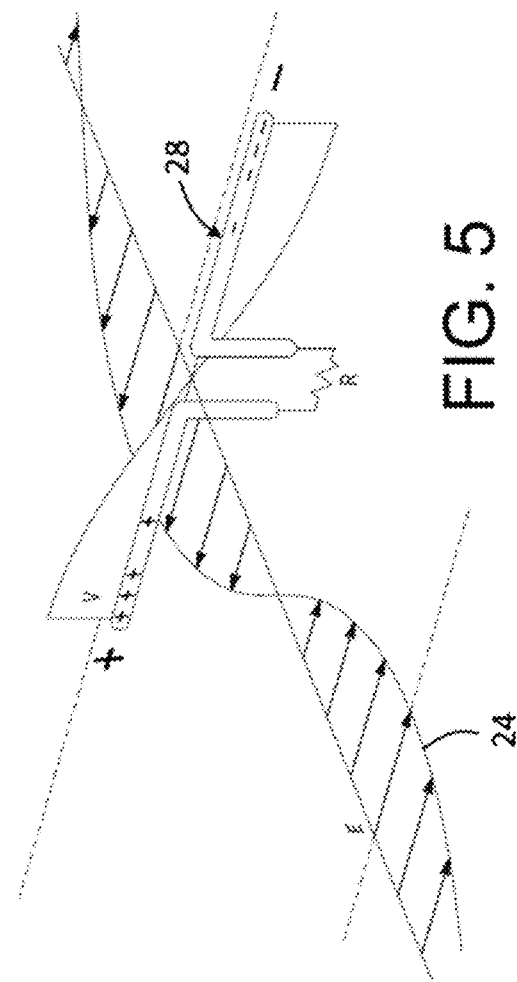
FIG. 5 illustrates operation of a radar receive antenna of the sensor assembly according to aspects of the disclosure.
Figure 6:
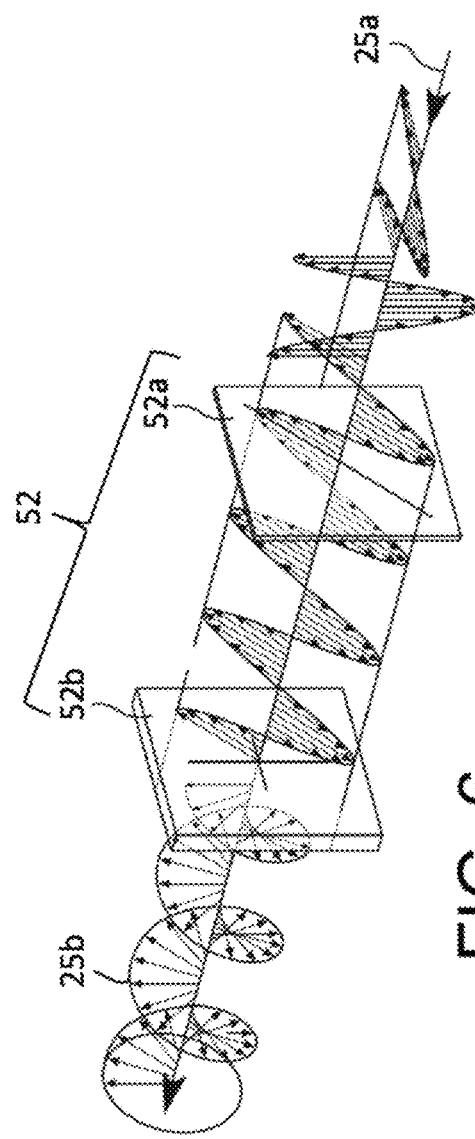
FIG. 6 is a schematic diagram illustrating polarization of electromagnetic waves from the sensor assembly according to aspects of the disclosure.

The sensor assembly 10 may also include a power supply circuit 64 electrically coupled to the sensor microprocessor 62 and for coupling with a power source. A communication circuit 66 may also be electrically coupled to the sensor microprocessor 62 and can be utilized by the sensor assembly 10 to communicate with a remote electronic control unit (ECU) 67, such as, a body control module (BCM) or a main non-contact obstacle detection system control unit. The sensor microprocessor 62 may communicate with the remote ECU 67 over a network such as a controller area network (CAN) or local interconnect network (LIN) bus. The sensor assembly 10 may also include a backlight 68 coupled to and controlled by the sensor microprocessor 62 (discussed in further detail below). FIG. 5 illustrates generation of the electromagnetic waves 24, 25 in the form of radio waves 24 that may be utilized for the plurality of radar transmitting antennas 26 and plurality of radar receiving antennas 28. Such radio waves 24 can be polarized for transmission through the filter cover 52, 58, 60 (e.g., reflective polarizer 52) as shown in FIG. 6. Polarization specifies the geometric orientation of the oscillations of the waves. In an electromagnetic wave 24, 25, by convention, polarization refers to the direction of the electric field. The electromagnetic waves 24, 25 can be polarized by passing through polarization filters (e.g., linear or circularly polarized). Linear polarized light can, thus, be blocked or reflected by orthogonal polarizers. In some embodiments, and as shown in FIG. 6, the reflective polarizer 52 includes a linear polarizer 52*a* and a quarter-wave plate 52*b*, that function together as a circular polarizer to create polarized light 25*b* having a circular polarization from a beam 25*a* of unpolarized light.

Figure 7:
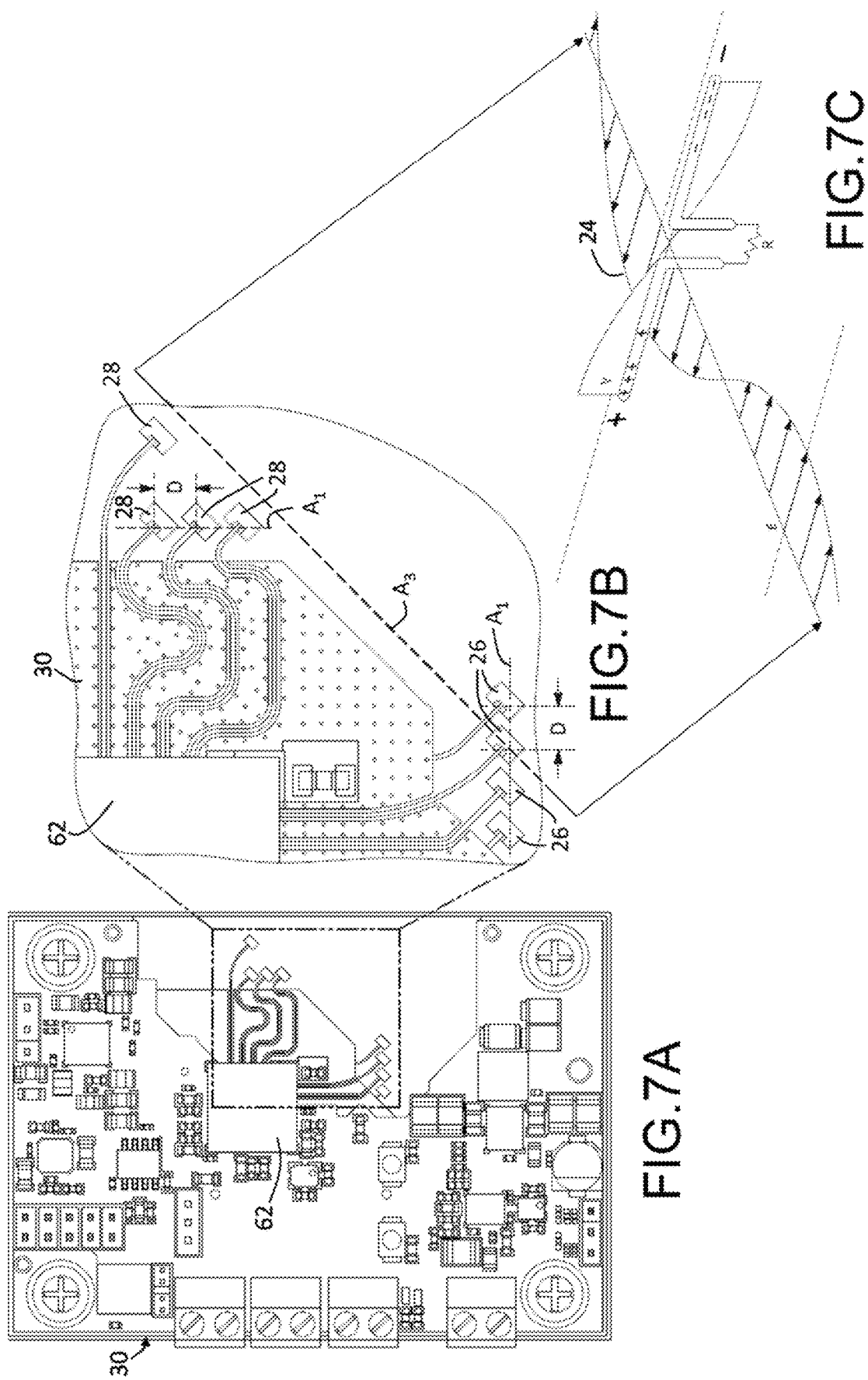
FIGS. 7A-7B illustrate a sensor printed circuit board of the sensor assembly and a plurality of radar transmitting antennas and a plurality of radar receiving antennas according to aspects of the disclosure.
FIG. 7C illustrates operation of a radar receive antenna of the sensor assembly according to aspects of the disclosure.

As best shown in FIGS. 7A-7C, the sensor assembly 10 also includes a sensor printed circuit board 30 and the at least one electromagnetic source 26, 27 (e.g., the plurality of radar transmitting antennas 26) and the at least one electromagnetic receiver 28, 29 (e.g., the plurality of radar receiving antennas 28) are disposed on the sensor printed circuit board 30 and electrically connected thereto. In more detail, and as shown, the direction of the polarization plane of the radio waves 24 can be arranged perpendicular to a plane of the plurality of radar transmitting antennas 26 and the plurality of radar receiving antennas 28. The sensor microprocessor 62 is also disposed on and electrically coupled to the sensor printed circuit board 30.

In some embodiments, and as shown in FIG. 7B, two or more of the radar transmitting antennas 26 are disposed at regular intervals along a first axis $A_1$, and spaced apart from one another by a predetermined distance D. Two or more of the radar receiving antennas 28 are disposed at regular intervals along a second axis $A_2$ that is perpendicular to the first axis $A_1$ and spaced apart from one another by the predetermined distance D. Each of the radar transmitting antennas 26 and the radar receiving antennas 28 have a rectangular shape with a large edge that is parallel to a third axis $A_3$ that is aligned forty-five degrees to each of the first axis $A_1$ and the second axis $A_2$.

In addition, as best shown in FIGS. 8, 8A-8B, and 9, the sensor assembly 10 includes a lower housing 32b of transparent plastic defining a closed end 34 and an open end 36 and including a cover flange 46 extending outwardly from the lower housing 32b adjacent the open end 36. The cover flange 46 is configured to engage and support the filter cover 52, 58, 60 transversely over the open end 36. In other words, and as shown in FIGS. 8A-8B, the cover flange 46 holds the filter cover 52, 58, 60 transverse to a plane of the open end 36 and extending above beyond the open end 36. An upper housing 32a of plastic is coupled to the lower housing 32b to define a sensor chamber 38 enclosing the sensor printed circuit board 30. Thus, as illustrated in FIG. 11, the electromagnetic waves 24, 25 (e.g., radio waves 24) can pass through the reflective polarizer 52, while visible light (visible light polarized orthogonal to the direction of polarization of the reflective polarizer 52 or radar polarization plane) is reflected, thus providing for the sensor assembly 10 to detect the object 22 through the reflective polarizer 52.

FIG. 12, for example, illustrates the transmittance of an example reflective polarizer 52. The P waves 84 (transmitted electromagnetic waves 24, 25) are transmitted through the reflective polarizer 52 and the S waves 86 (reflected electromagnetic waves 24, 25) are reflected by the reflective polarizer 52 (e.g. grid polarizer of wires 80). This is also illustrated graphically in FIG. 14, which shows lines of transmittance for P waves 84 (i.e. polarized EM radiation that is parallel to a reflective polarizer) and for S waves 86 (i.e. polarized EM radiation that is perpendicular to a reflective polarizer) according to aspects of the disclosure. According to an aspect, as shown in FIG. 13, the reflective polarizer 52 comprises a substrate 74 defining a plurality of peaks 76 and a plurality of parallel metal lines 78 are deposited on the plurality of peaks 76. Substrate 74 may be illustratively formed from an electromagnetic radiation (wave) transparent material, such as for example a polymer material such as plastic, or glass. Specifically, the plurality of peaks 76 can extend in parallel and in a spaced relationship to one another. A plurality of valleys 75 are provided between the peaks 76. Thus, some electromagnetic waves 24, 25 (e.g., radio waves 24) that are polarized in the same direction as the plurality of metal lines can be transmitted through the reflective polarizer 52 in between the plurality of parallel metal lines 78 deposited on the plurality of peaks 76. The remaining electromagnetic waves 24, 25 are reflected upon impinging the plurality of metal lines deposited such as by a spray coating application process, on the peaks of the substrate 74. The reflective polarizer 52 could alternatively be constructed using a grid of small diameter wires 80 arranged parallel to one another along with a plastic film 82, for example. For the reflective polarizer 52 to work, the diameter of each of the wires 80 (or spacing between the plurality of parallel metal lines 78) must be less than the wavelength of the incident electromagnetic waves 24, 25 and the material surrounding the wires 80 (or plurality of parallel metal lines 78) must be transparent to the wavelength of the incident electromagnetic waves 24, 25. If the spacing and diameter of the wires 80 is, for example, chosen to be less than nanometers, visible light and electromagnetic waves 24, 25 with larger wavelengths will not pass through the reflective polarizer 52 and/or reflected, depending on their polarization.

Such spacing between metal lines 78 provides an appearance of the substrate 74 to a person viewing it from the exterior as being a chromed or metallic finished class A surface of the vehicle, since the metal lines 78 are provided close enough such that the discontinuous reflective surfaces for visible light 79 reflect off viewed by a user as being a continuous reflective surface, while separated enough to allow electromagnetic waves 24, 25 to pass therethrough. Impinging visible light 79 may be therefore reflected off of metal lines 78 such that the reflected light 81 has a reflectance spectra matching a reflectance spectra of the deposited metal lines 78, which may provide the appearance of chrome, aluminum, gold, or other type of metallic finish providing an appearance to the vehicle component on which the filter cover 52, 58, 60 is formed, integrated or connected to of that being formed entirely of a metallic material, while the vehicle component being transmissive to electromagnetic waves without the vehicle component reducing or attenuating the strength of the electromagnetic waves, such as the transmitted or received electromagnetic waves, passing through the filter cover 52, 58, 60.

Figure 15:
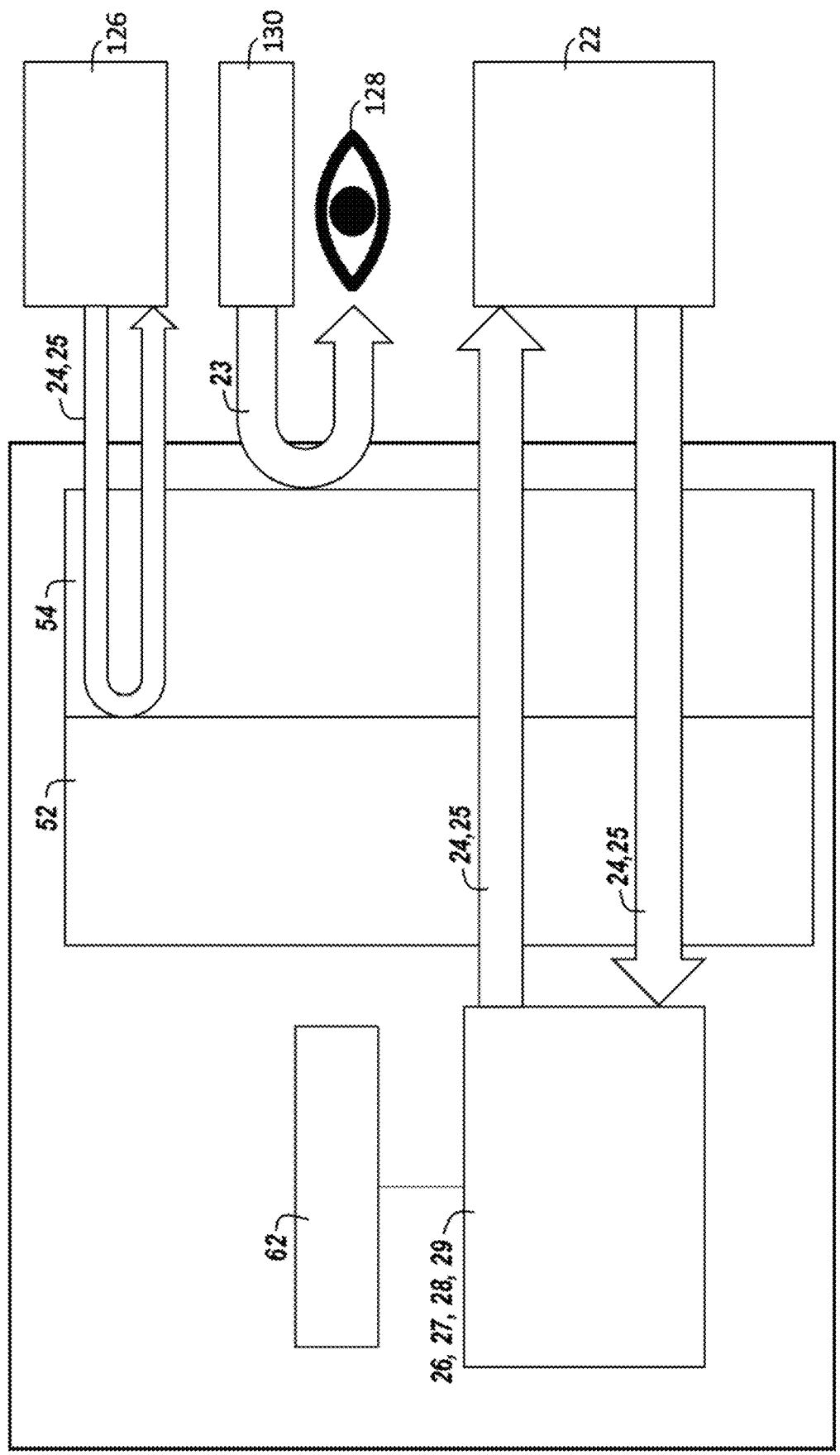
Figure 16:
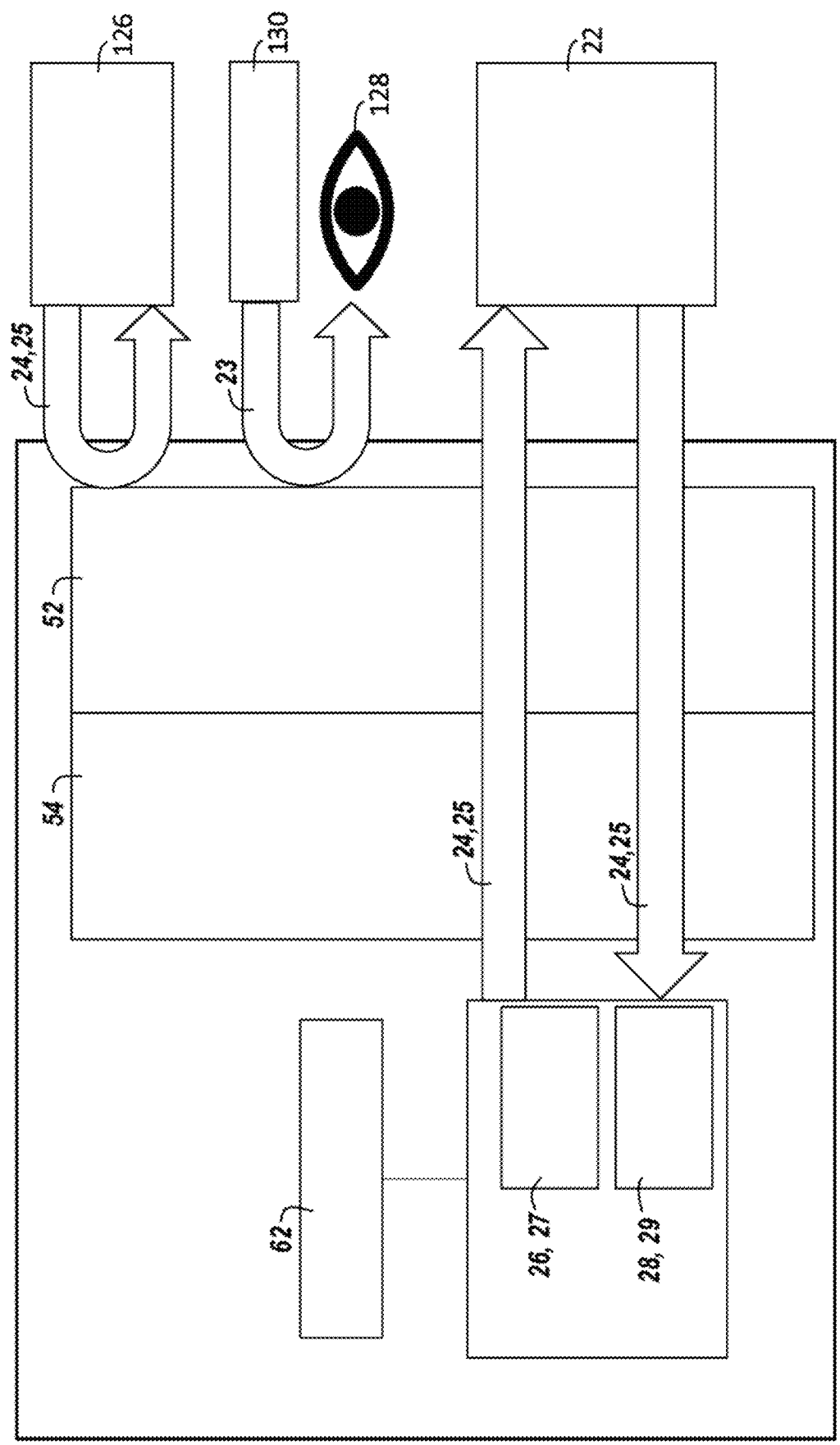
Figure 17:
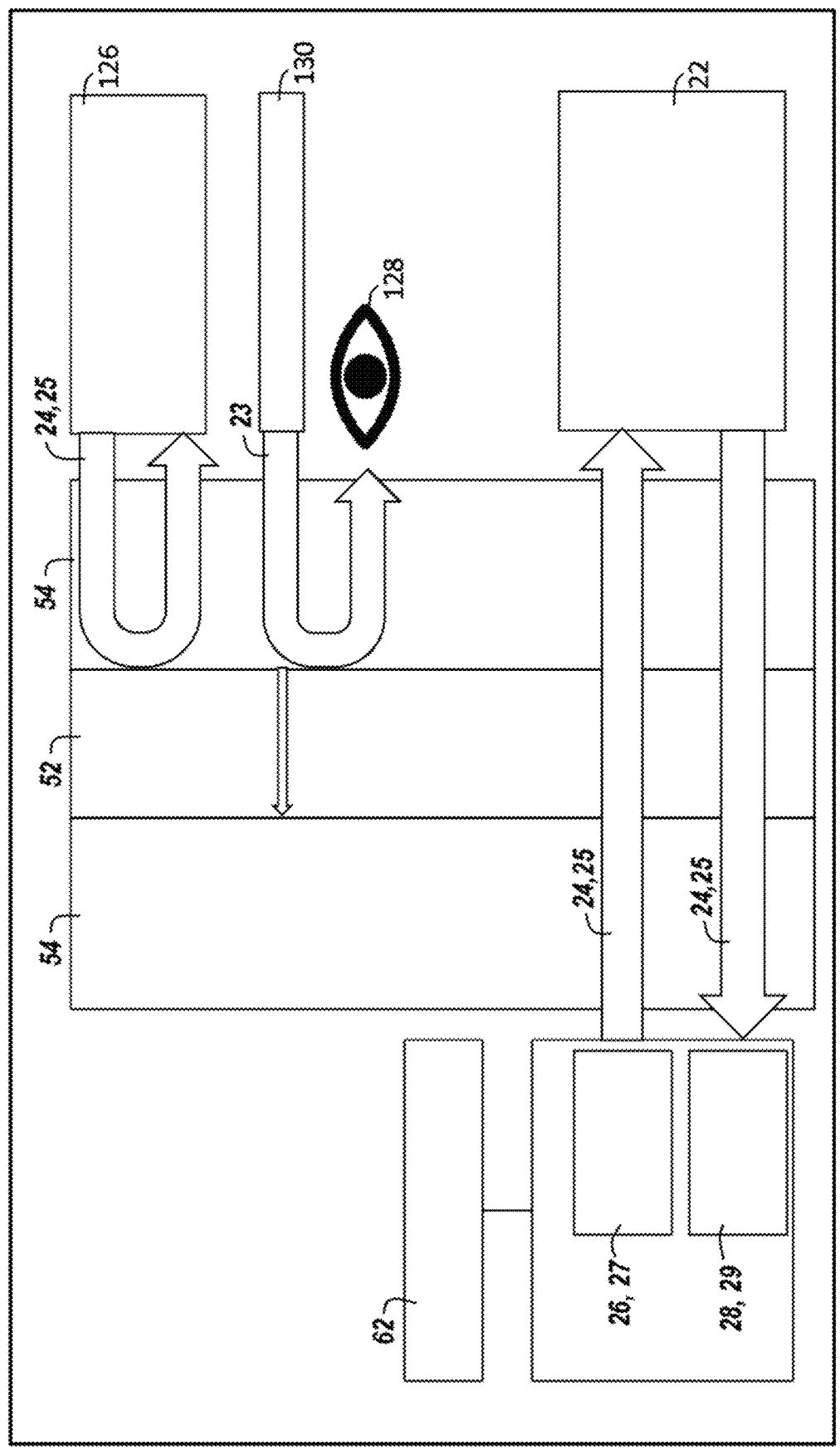
Figure 18:
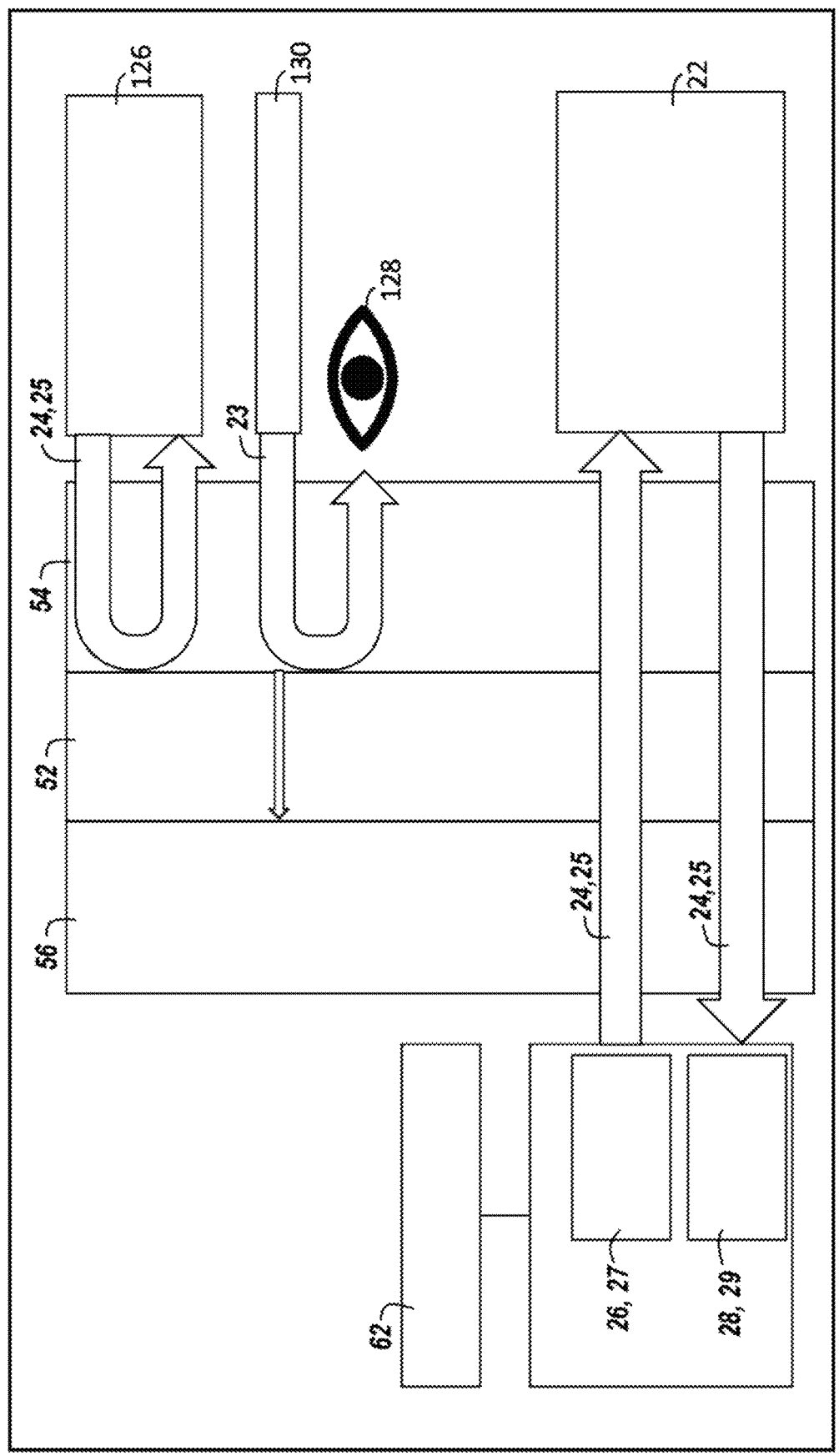

As best shown in FIG. 15, the sensor assembly 10 can also include a support layer 54 extending along and engaging the reflective polarizer 52. In some embodiments, the support layer 54 is transmissive to the electromagnetic waves 24, 25, allowing the electromagnetic waves 24, 25 to pass therethrough unimpeded. In more detail, the reflective polarizer 52 is disposed between the support layer 54 and the at least one electromagnetic source 26, 27. The reflective polarizer 52 can provide the support for the sensor assembly 10 upon the vehicle 14 (e.g., a single layer forms the reflective polarizer 52 and structure or support layer 54). The light reflective properties of the reflective polarizer 52 will not create the chromed/mirrored surface effect, but will provide a polarized filer for third party radar waves 24 (e.g., those generated by another vehicle 14). The reflective polarizer 52 may be aligned at forty five degrees relative to the vertical to prevent a third party polarized radar wave 24 polarized at forty-five degrees from vertical from passing through the reflective polarizer 52. Angling the reflective polarizer 52 in such a way provides for maximum probability of rejecting third party waves. Nevertheless, as shown in FIG. 16, the support layer 54 can instead be disposed between the reflective polarizer 52 and the at least one electromagnetic source 26, 27. In other words, the reflective polarizer 52 can be applied as a reflective polarizing film. Also, as shown in FIG. 17, one support layer 54 can be disposed on both sides of the reflective polarizer 52. The support layer 54 can be for protective purposes, for example, and can be formed of materials such as, but not limited to a polymer, glass, or a film. Furthermore, as best shown in FIG. 18, the sensor assembly 10 can also include a blocking layer 56 extending along and engaging the reflective polarizer 52 and disposed between the reflective polarizer 52 and the at least one electromagnetic source 26, 27. The blocking layer 56 can absorb any light that is transmitted through the reflective polarizer 52, so as to not be reflected back through the reflective polarizer 52.

Figure 19:
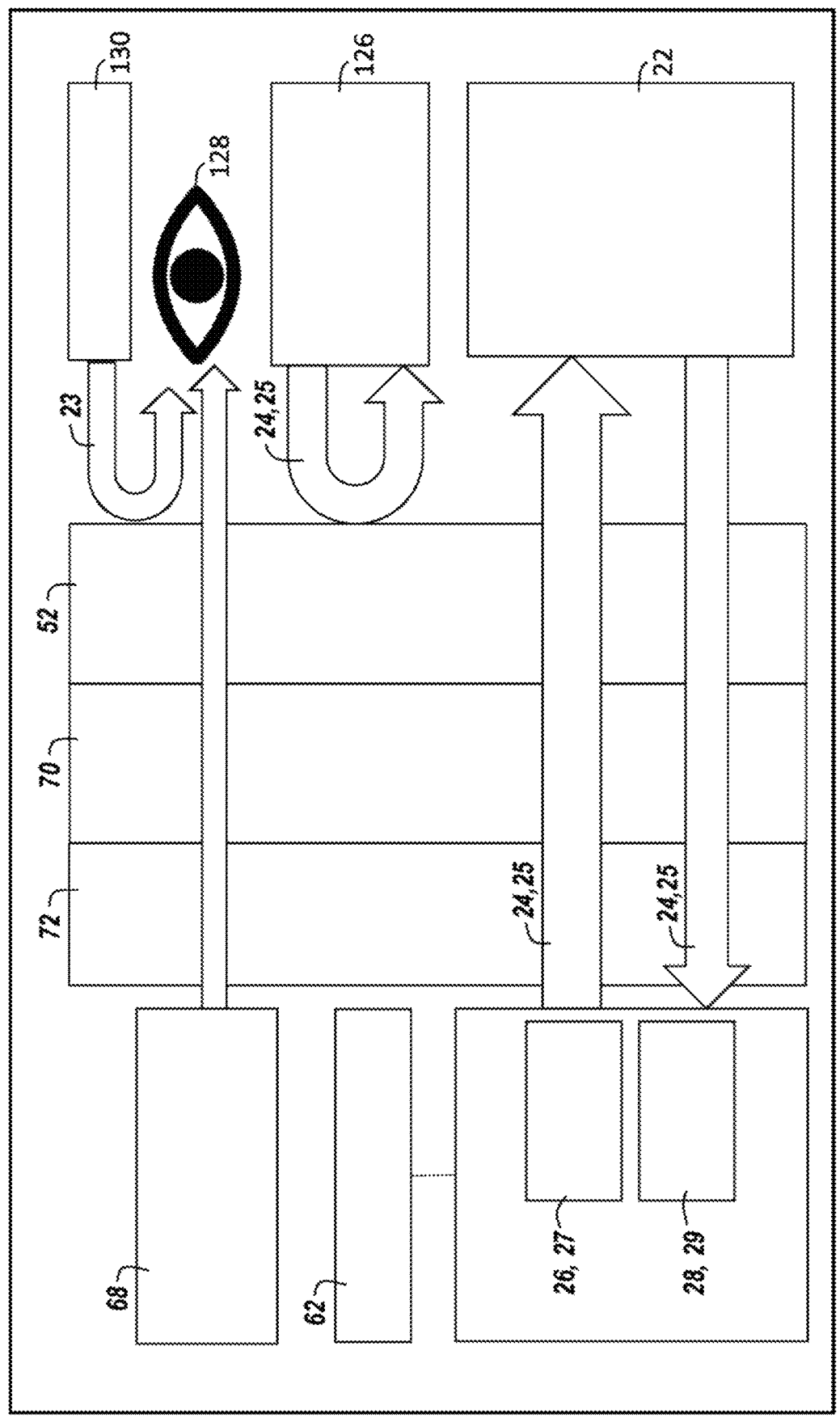

The sensor assembly 10 can also including a tinting layer 70 extending along and engaging the reflective polarizer 52 and disposed between the reflective polarizer 52 and the at least one electromagnetic source 26, 27, as best shown in FIG. 19. Also shown is a backlight polarizer layer 72 extending along and engaging the tinting layer 70 and disposed between the tinting layer 70 and the at least one electromagnetic source 26, 27. The backlight 68 (also shown in FIG. 4) is disposed adjacent the at least one electromagnetic source 26, 27 and is configured to generate light outwardly through the backlight polarizer layer 72, tinting layer 70, and reflective polarizer 52. Such an arrangement allows aligned polarized light to pass through the reflective polarizer 52 to be visible to a user (e.g., external to the vehicle 14). The tinting layer 70 tints the light from the backlight 68. According to an aspect, the backlight 68 comprises a backlight 68 configured to emit polarized light; however, it should be understood that the backlight 68, may alternatively be non-polarized.

Referring now to FIG. 20, two vehicles 14 are facing one another, much like what may occur on a two lane road. In instances in which the sensor assembly 10 is located in the front of the vehicle 14, the polarization direction can be offset from a vertical direction. Consequently, when vehicles 14 each including the sensor assembly 10 with reflective polarizer 52 are facing one another, the polarization axes are orthogonal to one another. Thus, the electromagnetic waves 24, 25 from the other vehicle 14 are rejected (i.e., maximum signal rejection), but reflections from the source of the emitting vehicle 14 pass through the reflective polarizer 52.

Now referring to FIGS. 21 to 23, the sensor assembly 10 may be configured to transmit and detect radio waves 24. The sensor assembly 10 can be configured to emit continuously modulated radiation, ultra-wideband radiation, or sub-millimeter-frequency radiation (e.g., frequencies forming part of the ISM frequency band about 24 GHz, or the 60 GHz, or the 80 Hz frequency band as examples, but other ranges are also contemplated). For example, the sensor assembly 10 may be configured to emit continuously emitted radiation by the radar emitting element 26, such as an antenna 26, or continuous wave (CW) radar, known in the art to use Doppler radar techniques, which can be employed in the radar-based obstacle or gesture recognition sensor as illustrated in FIG. 21. A modulated emitted radiation by the radar emitting element 26, or frequency modulated continuous wave (FMCW) radar, also known in the art to use Doppler radar techniques, may also be employed in the sensor assembly 10 as illustrated in FIG. 22. Also, the sensor may be configured for pulsed time-of-flight radar. The sensor assembly 10 includes one or more receive elements 28, such as antenna(s), for receiving the reflections of the transmitted radar waves 24, which reflect off of an object 22. The radar emitting element 26 may be integrated into the sensor printed circuit board 30, or integrated into a radar chip affixed to the sensor printed circuit board 30.

The sensor assembly 10 may be configured to emit and detect continuous wave (CVV) radar, as is illustratively shown in FIG. 21 with the radar sensor including one transmit antenna 26 and one receive antenna 28. With such a configuration, the radar sensor is operable to detect a speed/velocity of the object 22 using the Doppler Radar principles (i.e. processing by the sensor microprocessor 62 or a dedicated local application specific radar signal processor 1506 of the received reflected CW radar signal to determine frequency shifts of an emitted continuous radiation wave indicative of the speed of the object 22). The radar emitting element 26 can be also configured to emit frequency modulated continuous wave (FMCW) radar, as is illustratively shown in FIG. 22, with the radar sensor including one transmit antenna 26 and one receive antenna 28. With such a configuration, the radar sensor is operable to detect a motion of the object 22 using the Frequency Modulated Radar techniques (i.e. processing by a signal processor 1506 or the sensor microprocessor 62 of the reflected FMCW radar signal to determine frequency shifts indicative of the speed (Doppler frequency) and distance (beat frequency) of the object 22). Alternatively the FMCW radar sensor can be configured to include at least two receive antennas $28_1$, $28_2$, to $28_n$ forming an antenna array, as shown in FIG. 23 Also, multiple transmit antennas $26_n$ may be provided. The signal processor 1506 is illustrated disposed in communication with the antenna element(s) 28 through signal processing elements such as high/low gain signal amplifiers 1508, a mixer 1510 configured to mix the received signal with the transmitted signal generated by a waveform generator 1512 as received from a splitter 1514 for processing the received reflections (i.e. the signal processor 1506 or the sensor microprocessor 62 can be configured execute instructions stored in a memory to perform calculations on the received reflection and transmitted radiation signals (i.e. mixed signals) to implement the various detection techniques or algorithms (e.g. CW Radar, FMCW Radar, time of flight) within the intermediate radar field to provide data for determining the motion, speed, distance, positions and direction of the object. For example, the signal processor 1506 or the sensor microprocessor 62 can be configured to process the received reflection to determine a Doppler shift for calculating the speed/velocity of the object 22, or a frequency shift for calculating the distance and speed of the object 22.

Because the reflective polarizer 52 can appear as a mirrored surface, the sensor assembly 10 can be disposed in various locations on the vehicle 14 where a mirrored or chrome surface may ordinarily be utilized, for example. FIG. 24 shows various examples of preferable locations of the sensor assembly 10 utilizing the reflective polarizer 52. Specifically, FIG. 24 shows several different example locations and devices where the reflective polarizer 52 may be located. Those locations include various vehicle components for example such as trim pieces such as external logos or emblems, door trim, handles, internal or external rearview mirrors, badge, applique, or a grill or fascia. Such pieces may have a bright or shiny finish, and for example a metallic finish such as a chromed or aluminum finish. Visible light impinging on a metallic surface is reflected with reflectance spectra based on the type of metal. The reflective polarizer 52 may be configured in a manner as described herein so as to provide a portion of the reflective polarizer 52 that can reflect light having a reflectance spectra of a metal so as to provide the appearance to an viewer viewing the exterior of the vehicle component, and for example when the reflective polarizer 52 forms the exterior surface 51 (e.g. a class A surface) of the vehicle component, that the vehicle component is coated completely with such a metal, while allowing electromagnetic waves, such as radar waves to pass through the vehicle component unattenuated. So, as mentioned above, the sensor assembly 10 could for example be utilized for various uses, such as, but not limited to non-contact obstacle detection, adaptive cruise control, automated driving (ADAS), and triggering operation of various powered closure members 12, 12' of the vehicle 14.

FIGS. 25-27 show sensor ports 58 formed in a panel 90 of sheet metal of a vehicle door 12' according to aspects of the disclosure. Specifically, the door 12' includes an outer surface 92 that faces outwardly when the door 12' is closed. The door 12' also includes a shut face panel 94 that extends perpendicularly to the outer surface 92, with the sensor port 58 formed in the shut face panel 94. The shut face panel 94 may be substantially or approximately perpendicularly to the outer surface 92, and the shut face panel 94 may be exposed only when the door 12' is open or ajar.

While the at least on electromagnetic source 26, 27 has been described above as comprising a plurality of radar transmitting antennas 26 and the at least one electromagnetic receiver 28, 29 has been described as being a plurality of radar receiving antennas 28, it should be understood that the at least one electromagnetic source 26, 27 can instead include at least one infrared laser light source configured to produce pulsed laser light 25 (i.e., LIDAR). Consequently, the at least one electromagnetic receiver 28, 29 may include at least one infrared laser light receiver and the electromagnetic waves 24, 25 are pulsed laser light 25.

Figure 29:
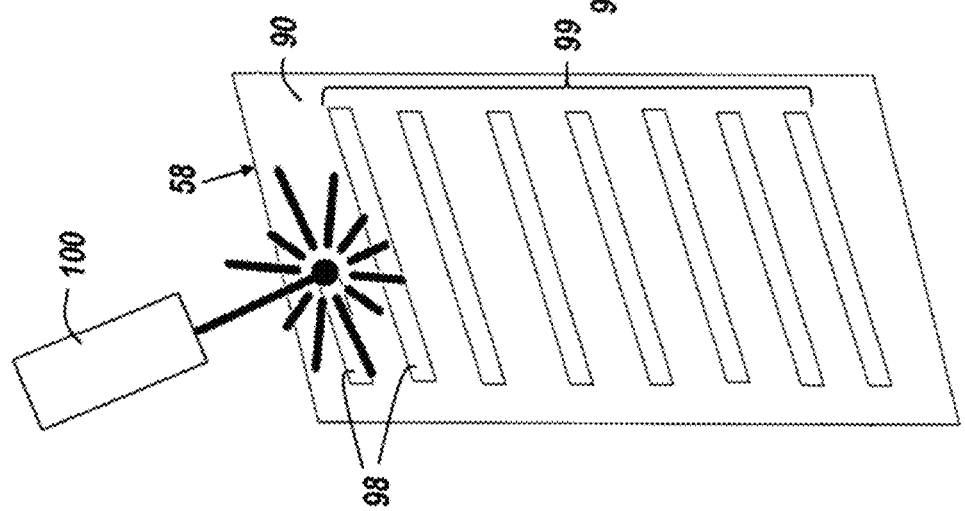

In instances where vehicle 14 styling or other considerations demand that the sensor assembly 10 be located in other areas in which a reflective polarizer 52 is not preferred, the filter cover 52, 58, 60 of the sensor assembly 10 can comprise a sensor port 58 that may be added to the vehicle 14 through one or more panels 90 of the vehicle 14 in various locations, as best shown in FIGS. 25-27. Such sensor ports 58 can be polarized similarly to the reflective polarizer 52 described above, but are integrally formed in a panel 90 of sheet metal, as described in more detail in a method below. As with the reflective polarizer 52 described above, and as shown in FIG. 28, the sensor assembly 10 can generate a radio wave 24, for example, having polarization aligned with an axis of the polarization of the sensor port 58 formed in the panel 90 of sheet metal, which passes therethrough. The sensor port 58 can comprise a plurality of gaps 98 and the spacing between the plurality of gaps 98 are tuned to match the frequency or wavelength of the radio wave 24. Thus, radio waves 24, which may be reflected radio waves off of an object, or from another electromagnetic source such as another ADAS system from a vehicle for example, having misaligned polarization are not allowed to pass through the sensor port 58. As shown in FIG. 29, a filler 102 that is electromagnetically transparent can fill the gaps 98 in the grid formed in the panel 90, and a paint 104 (and primer) can be form an outer surface, concealing the sensor port 58. The paint 104 must be electromagnetically transparent (e.g., transparent to radio waves 24). In other words, each of the filler 102 and the paint 104 are transmissive to the electromagnetic radiation 24, 25 used in the sensor assembly 10. In some embodiments, each of the filler 102 and the paint 104 are transmissive to radio waves 24.

In some embodiments, and as shown in FIGS. 28-33, the sensor port 58 includes the sheet metal panel 90 defining a plurality of gaps 98, with each of the gaps 98 being parallel to and spaced from one another by a predetermined distance to define a grid area 99. In some embodiments, the predetermined distance between each of the plurality of gaps 98 in the panel 90 is based on the frequency of the electromagnetic waves 24, 25. In some embodiments, radio waves 24 having polarization that is misaligned with the gaps 98 are not allowed to pass through the sensor port 58.

The parallel gaps 98 in the panel 90 may be formed by etching or cutting sheet metal using a laser 100 (FIG. 29). Additionally or alternatively, other methods and/or devices may be used to form the gaps 98. For example, the gaps 98 may be formed by cutting, grinding, chemical etching and/or stamping the panel 90 in the grid area 99.

In some embodiments, and as shown in FIG. 31, a filler 102 of electromagnetically transparent material fills and/or covers the gaps 98. Excess filler 102 may be removed to produce continuous a top surface that is flush with the panel 90 surrounding the grid area 99. The panel 90 and filler 102 may be coated with a paint 104 that is electromagnetically transparent (i.e. which is transmissive to the electromagnetic waves 24, 25) and which has an appearance matching the sheet metal panel 90 of the vehicle adjacent to the sensor port 58, thus concealing the sensor port 58.

FIG. 32 shows a partial perspective view of an example vehicle door 12' similar to FIGS. 25-26. However, the vehicle door 12' shown in FIG. 32 also includes a sensor port 58 formed in an inner edge 96 of the vehicle door 12' extending perpendicularly to the shut face panel 94. In other words, the shut face panel 94 faces inwardly toward the vehicle 14 when the door 12' is closed and is exposed when the door 12' is opened. In various embodiments, one or more sensor ports 58 may be formed in either or both of the shut face panel 94 and/or the inner edge 96. The shut face panel 94 and the inner edge 96 of the vehicle door 12' together define a latch opening 97 for accepting latch hardware (not shown) for holding the vehicle door 12' closed.

As best shown in FIGS. 35-36, the filter cover 52, 58, 60 can instead comprise a dielectric mirror 60 including a plurality of high refractive layers 110 and low refractive layers 112 arranged in an alternating arrangement. Specifically, the dielectric mirror 60 includes a plurality of alternating high refractive layers 110 of a first refractive index and having a first thickness $d_1$ and a plurality of low refractive layers 112 of a second refractive index different, such as being less for example, than the first refractive index and having a second thickness $d_2$. In some embodiments, and as shown in FIG. 35, the first thickness $d_1$ is different than the second thickness $d_2$. More specifically, in some embodiments, the second thickness $d_2$ is greater than the first thickness $d_1$. In some embodiments, the second thickness $d_2$ is the same as or less than the first thickness $d_1$. In some embodiments, and as shown in FIG. 35, the dielectric mirror 60 includes two or more of the high refractive layers 110 alternatingly stacked with the low refractive layers 112. Some or all of an incident light beam 140 is reflected as a first reflected beam 142 by a face of one of the low refractive layers 112 and/or by a face of one of the high refractive layers 110. Alternatively or additionally, some or all of the incident light beam 140 is also reflected as a second reflected beam 144 by a face of one of the low refractive layers 112 and/or by a face of one of the high refractive layers 110. Differences in refractive indices of each of the high refractive layers 110 and the low refractive layers 112 may cause the first reflected beams 142 and the second reflected beams 144 to be spaced apart from one another, as shown in FIG. 35.

Now referring to FIG. 36, there is provided a method of forming an electromagnetic wave transparent portion of a vehicle component for a sensor concealed by the vehicle component 1000, the electromagnetic wave transparent portion allowing transmission of electromagnetic waves at least one of to and from the sensor and reflecting visible light impinging on an exterior surface of the vehicle component, the method 1000 including the steps of providing the vehicle component having a substrate allowing transmission of the electromagnetic waves 1002, and providing a light reflective material along the substrate, the light reflective material configured to reflect the visible light away from the sensor and to allow transmission of the electromagnetic waves 1004. The step 1004 of providing a light reflective material along the substrate may include providing a series of multiple thin layers of dielectric material forming a dielectric mirror. The step 1004 of providing a light reflective material along the substrate may include depositing a metal on a portion of the substrate 1006, and in other words a depositing a metal that does not completely cover the substrate, the portion on the substrate having the metal configured to reflect the visible light, which may have a reflectance spectra of the deposited metal, away from the sensor and the portion on the substrate not having the metal configured to reflect the visible light away from the sensor and the portion on the substrate not having metal configured to allow transmission of the electromagnetic waves. The step 1006 of depositing a metal on a portion of the substrate may include forming a grid of metal lines, for example parallel or substantially parallel metal lines, separated by gaps on the substrate. The step 1002 of providing the substrate may include providing the substrate with a plurality of peaks and valleys, and wherein the metal is deposited on the peaks to form the grid of metal lines, wherein the valleys do not have deposited metal to allow transmission of the electromagnetic waves. The step 1006 of depositing a metal on a portion of the substrate may include depositing the metal such the polarization direction of the grid of metal lines is aligned with a polarizing direction of an antenna of the sensor such that electromagnetic waves received by or transmitted from passes unimpeded through the grid or metal lines, and in other words steps 1006 includes aligning the grid of metal lines with a polarizing direction of the electromagnetic waves emitted by the sensor Now referring to FIG. 37, there is provided a method of assembling a sensor system for a vehicle 2000 including the steps of providing at least one of an electromagnetic source configured to emit electromagnetic waves having a polarization direction and an electromagnetic receiver configured to receive the electromagnetic waves having the polarization direction 2002; providing a vehicle component in front of the at least one of an electromagnetic source and an electromagnetic receiver to conceal the at least one of an electromagnetic source and an electromagnetic receiver when viewed from an exterior of the vehicle component 2004; and providing a polarizer on the vehicle component configured to transmit the electromagnetic waves being polarized in the polarization direction 2006. In a related aspect of the method 2000, a polarization of the polarizer is aligned with the polarization direction of the electromagnetic waves, and method 2000 includes aligning the polarization direction of the polarizer with the polarization direction of the electromagnetic waves. In a related aspect of the method 2000, the polarizer is a reflective polarizer and is further configured to reflect visible light impinging on the exterior of the vehicle component. In a related aspect of the method 2000, the reflective polarizer is a wire grid polarizer, the wire grid polarize providing a metallic finish to the vehicle component when viewing the exterior of the vehicle component.

Referring back now to FIGS. 24 to 27, there is provided a metallic vehicle panel for a vehicle 14 formed from at least one panel of sheet metal, such as an inner sheet metal panel 111 or outer sheet metal panel 113, or a shut face 90, 94, or a side panel such as a quarter panel 115 of other body panel, as examples, the metallic vehicle panel including a sensor port 58 formed in the at least one panel of sheet metal, the sensor port 58 including a plurality of gaps 98 being parallel, or substantially parallel, and spaced apart from one another. The metallic vehicle panel for a vehicle 14 may be further configured to include a seal for sealing the sensor port 58, the seal transmissive to electromagnetic waves. The seal may be for example a filler 102 provided within each of the plurality of gaps 98, such as a plastic or rubber filler as examples, and being transmissive to electromagnetic waves. The seal could be other configurations such as a plug, or cover for preventing external environment, such as rain, water and wind from passing through the gaps 98 in the sheet metal panel. The sensor port 58 may be covered by a paint being transmissive to the electromagnetic waves and having an appearance matching the panel of sheet metal adjacent to the sensor port 58. The sensor port 58 may be disposed on one of an externally exposed surface of the vehicle, an inner edge or a shut face panel of a closure member of a vehicle (FIG. 32), on an externally exposed surface of the closure member (FIG. 27), for example in a middle portion of the closure member, and an internally exposed surface of the closure member (FIG. 26).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with an example sensor assembly can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments. Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. A sensor assembly for detecting an object comprising:
   at least one electromagnetic source configured to emit electromagnetic waves;
   at least one electromagnetic receiver configured to receive the electromagnetic waves after reflecting from the object and corresponding with a detection of the object in proximity to said sensor assembly;
   a filter cover disposed adjacent to and covering said at least one electromagnetic source and said at least one electromagnetic receiver, the filter cover being transmissive to the electromagnetic waves and reflective to a visible light, thereby concealing said at least one electromagnetic source and said at least one electromagnetic receiver;
   wherein said filter cover is associated with an exterior surface of a vehicle, and wherein the exterior surface has an appearance of a metal; and
   wherein the filter cover comprises a reflective polarizer configured to transmit the electromagnetic waves polarized in a first direction and to reject the electromagnetic waves polarized in a second direction different than the first direction, and wherein visible light impinging on an external surface of the reflective polarizer is reflected as visible light having reflectance spectra matching reflectance spectra of the exterior surface of the vehicle so that the reflective polarizer has the appearance of the metal to a person viewing the reflective polarizer.

2. The sensor assembly as set forth in claim 1, wherein the filter cover comprises a dielectric mirror configured to reflect the visible light and transmit the electromagnetic waves.

3. The sensor assembly as set forth in claim 1, further including a sensor printed circuit board with said at least one electromagnetic source and said at least one electromagnetic receiver disposed on said sensor printed circuit board and electrically connected thereto.

4. The sensor assembly as set forth in claim 3, wherein the exterior surface of the vehicle comprises a component selected from the group consisting of a logo, an emblem, a badge, a door trim, a door handle, an external rearview mirror, a trim piece, a grill, a fascia, or an applique.

5. The sensor assembly as set forth in claim 3, further including a sensor microprocessor disposed on and electrically coupled to said sensor printed circuit board and electrically coupled to said at least one electromagnetic source and said at least one electromagnetic receiver and configured to control emission of the electromagnetic waves using said at least one electromagnetic source and to detect the object in proximity to said sensor assembly using said at least one electromagnetic receiver.

6. The sensor assembly as set forth in claim 1, wherein said at least one electromagnetic source is configured to polarize the electromagnetic waves in the first direction.

7. The sensor assembly as set forth in claim 6, further including a support layer being transmissive to the electromagnetic waves and extending along and engaging said reflective polarizer, with said reflective polarizer disposed between said support layer and said at least one electromagnetic source.

8. The sensor assembly as set forth in claim 6, further including a support layer being transmissive to the electromagnetic waves and extending along and engaging said reflective polarizer, with said support layer disposed between said reflective polarizer and said at least one electromagnetic source.

9. The sensor assembly as set forth in claim 6, further including a blocking layer configured to block the visible light from passing therethrough, the blocking layer extending along and engaging said reflective polarizer and disposed between said reflective polarizer and said at least one electromagnetic source.

10. The sensor assembly as set forth in claim 6, further including a tinting layer configured to tint the visible light from passing therethrough, the tinting layer extending along and engaging said reflective polarizer and disposed between said reflective polarizer and said at least one electromagnetic source.

11. The sensor assembly as set forth in claim 10, further including a backlight adjacent said at least one electromagnetic source and configured to generate light outwardly through said reflective polarizer.

12. The sensor assembly as set forth in claim 11, wherein said backlight comprises a polarized backlight.

13. The sensor assembly as set forth in claim 12, further including a backlight polarizer layer extending along and engaging said tinting layer, with said backlight polarizer layer is disposed between said tinting layer and said at least one electromagnetic source, wherein said backlight is configured to generate light outwardly through said backlight polarizer layer and said tinting layer and said reflective polarizer.

14. The sensor assembly as set forth in claim 6, wherein said reflective polarizer comprises a substrate defining a plurality of peaks and a plurality of parallel metal lines deposited on said plurality of peaks.

15. The sensor assembly as set forth in claim 1, wherein said at least one electromagnetic source includes a plurality of radar transmitting antennas and said at least one electromagnetic receiver includes a plurality of radar receiving antennas, and wherein the electromagnetic waves are radio waves.

16. The sensor assembly as set forth in claim 1, wherein said at least one electromagnetic source includes an infrared laser light source configured to produce pulsed laser light, and said at least one electromagnetic receiver includes an infrared laser light receiver; and wherein the electromagnetic waves are the pulsed laser light.

17. The sensor assembly as set forth in claim 1, wherein said filter cover comprises a sensor port in a panel of sheet metal, the sensor port including a plurality of gaps being parallel and spaced apart from one another and being transmissive to the electromagnetic waves.

18. The sensor assembly as set forth in claim 17, wherein the sensor port including a filler within each of the plurality of gaps and being transmissive to the electromagnetic waves, and wherein said sensor port is covered by a paint being transmissive to the electromagnetic waves and having an appearance matching the panel of sheet metal adjacent to the sensor port.

\* \* \* \* \*

UNITED STATES PATENT AND TRADEMARK OFFICE
CERTIFICATE OF CORRECTION

PATENT NO. : 12,235,389 B2
APPLICATION NO. : 16/554701
DATED : February 25, 2025
INVENTOR(S) : Traian Miu et al.

Page 1 of 1

It is certified that error appears in the above-identified patent and that said Letters Patent is hereby corrected as shown below:

In the Specification

Column 9
Line 52, "continuous wave (CVV) radar" should be --continuous wave (CW) radar--

In the Claims

Column 15
Lines 56-57, Claim 1, "having reflectance spectra matching reflectance spectra" should be --having a reflectance spectra matching a reflectance spectra--

Signed and Sealed this
Twenty-fifth Day of March, 2025

Coke Morgan Stewart
*Acting Director of the United States Patent and Trademark Office*